(12) United States Patent
Kim

(10) Patent No.: US 10,046,779 B2
(45) Date of Patent: *Aug. 14, 2018

(54) ENERGY HARVESTER AND WIRELESS SENSOR DEVICE HAVING ENERGY HARVESTER

(71) Applicant: Korea Railroad Research Institute, Uiwang-si, Gyeonggi-do (KR)

(72) Inventor: Jaehoon Kim, Goyang-si (KR)

(73) Assignee: KOREA RAILROAD RESEARCH INSTITUTE, Uiwang-si, Gyeonggi-Do (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/430,665

(22) Filed: Feb. 13, 2017

(65) Prior Publication Data

US 2017/0151964 A1 Jun. 1, 2017

Related U.S. Application Data

(60) Division of application No. 14/927,861, filed on Oct. 30, 2015, now Pat. No. 9,701,325, which is a
(Continued)

(30) Foreign Application Priority Data

Apr. 30, 2013 (KR) .................. 10-2013-0048539
Apr. 30, 2013 (KR) .................. 10-2013-0048545
Oct. 24, 2013 (KR) .................. 10-2013-0127338

(51) Int. Cl.
*G06F 7/00* (2006.01)
*B61L 15/00* (2006.01)
(Continued)

(52) U.S. Cl.
CPC ............ *B61L 15/0018* (2013.01); *B61K 9/00* (2013.01); *B61L 15/0081* (2013.01);
(Continued)

(58) Field of Classification Search
USPC ....................................................... 701/31.4
See application file for complete search history.

(56) References Cited

U.S. PATENT DOCUMENTS 6,984,902 B1   1/2006  Huang
8,648,480 B1   2/2014  Liu
(Continued)

FOREIGN PATENT DOCUMENTS

JP    2008-168761        7/2008
KR    10-0693891 B1      3/2007
(Continued)

OTHER PUBLICATIONS

International Search Report for PCT/KR2014/003861 dated Aug. 6, 2014.

*Primary Examiner* — Tyler D Paige
(74) *Attorney, Agent, or Firm* — Pearne & Gordon LLP

(57) ABSTRACT

A wireless sensor device includes: an energy harvester configured to convert vibration generated from a broadband vibration source into electricity, an elastic member arranged to receive the vibration and a communication unit fixed by the elastic member, supplied with the converted electricity from the energy harvester, and configured to transmit sensing information obtained by sensing a measurement target. The elastic member operates as a mechanical filter configured to limit a frequency range and an acceleration magnitude of the vibration to be transferred to the communication unit for stabilizing the performance of the communication unit, and the communication unit is arranged to receive vibration passing through the elastic member.

11 Claims, 19 Drawing Sheets

Related U.S. Application Data continuation of application No. PCT/KR2014/003861, filed on Apr. 30, 2014.

(51) Int. Cl.
    *H02K 7/18*     (2006.01)
    *H02N 2/18*     (2006.01)
    *H02K 35/02*     (2006.01)
    *B61K 9/00*     (2006.01)
    *B61L 27/00*     (2006.01)
    *G01M 17/08*     (2006.01)
    *G01D 5/02*     (2006.01)

(52) U.S. Cl.
    CPC ........ *B61L 27/0005* (2013.01); *B61L 27/0077* (2013.01); *G01D 5/02* (2013.01); *G01M 17/08* (2013.01); *H02K 7/1892* (2013.01); *H02K 35/02* (2013.01); *H02N 2/186* (2013.01)

(56) References Cited

U.S. PATENT DOCUMENTS

| | | | |
|---|---|---|---|
| 9,103,920 B2 | 8/2015 | Valentino | |
| 9,350,274 B2 | 5/2016 | Chimamkpam | |
| 9,701,325 B2* | 7/2017 | Kim | B61L 15/0081 |
| 9,751,540 B2* | 9/2017 | Cook | B61H 11/00 |
| 2007/0205881 A1 | 9/2007 | Breed | |
| 2008/0024140 A1* | 1/2008 | Henson | H02H 1/0015 |
| | | | 324/536 |
| 2010/0076714 A1 | 3/2010 | Discenzo | |
| 2012/0255349 A1 | 10/2012 | Pop et al. | |
| 2013/0035901 A1 | 2/2013 | Breed | |
| 2014/0046494 A1 | 2/2014 | McAlister | |
| 2014/0062223 A1* | 3/2014 | Park | H02K 35/04 |
| | | | 310/12.12 |
| 2014/0263989 A1 | 9/2014 | Valentino | |
| 2014/0312242 A1 | 10/2014 | Valentino | |
| 2015/0288299 A1* | 10/2015 | Park | H01L 41/1136 |
| | | | 310/319 |
| 2016/0001799 A1* | 1/2016 | Cook | B61H 11/00 |
| | | | 105/35 |
| 2016/0152252 A1* | 6/2016 | Kim | H02N 2/186 |
| | | | 701/31.4 |
| 2017/0151964 A1* | 6/2017 | Kim | B61L 15/0018 |

FOREIGN PATENT DOCUMENTS

| | | |
|---|---|---|
| KR | 10-2008-0019788 A | 3/2008 |
| KR | 10-2009-0056086 A | 6/2009 |
| KR | 10-1044208 B1 | 6/2011 |
| KR | 10-1093021 B1 | 12/2011 |
| KR | 10-2013-0024071 A | 3/2013 |
| WO | 2008/132423 A1 | 11/2008 |

\* cited by examiner

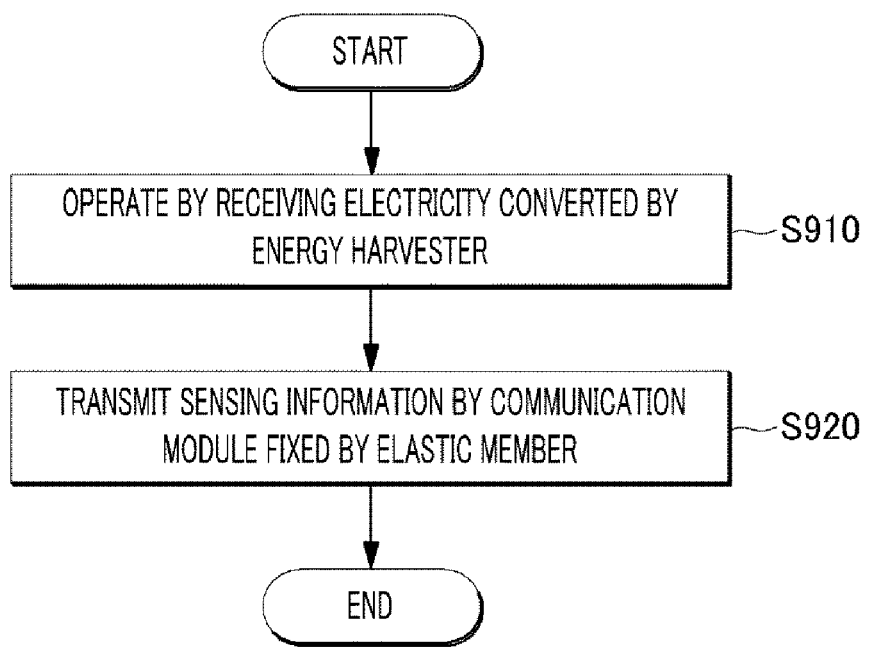

ENERGY HARVESTER AND WIRELESS SENSOR DEVICE HAVING ENERGY HARVESTER

CROSS-REFERENCE TO RELATED APPLICATION

This is a divisional application of U.S. patent application Ser. No. 14/927,861, filed on Oct. 30, 2015 which is national phase application under 35 U.S.C. § 371 of PCT Patent Application No. PCT/KR2014/003861, filed on Apr. 30, 2014, which claims the benefit of the Korean Patent Application No. 10-2013-0048539, filed on Apr. 30, 2013, the Korean Patent Application No. 10-2013-0048545, filed on Apr. 30, 2013, and the Korean Patent Application No. 10-2013-0127338, filed on Oct. 24, 2013, the entire disclosure of which is incorporated herein by reference.

TECHNICAL FIELD

The present disclosure relates to an energy harvester which can be used in a system for monitoring a status of a railroad vehicle in real time, and a wireless sensor device having the same.

BACKGROUND

A conventional railroad monitoring system relies on a wired sensor monitoring technology, and, thus, it is limited in that it does not guarantee reliability and stability during maintenance and management. In particular, it is difficult to access components in a truck and a running gear of a railroad vehicle, and installation of a wired sensor therein is limited. Therefore, it is difficult to acquire real-time monitoring data of main devices of the railroad vehicle.

In this regard, Korean Patent Laid-open Publication No. 10-2009-0056086 (entitled "System and method for monitoring safety of railroad facilities") discloses a system and method for monitoring safety of railroad facilities, including: multiple sensor nodes installed in the railroad facilities to detect a status of the railroad facilities and configured to perform a signal process to the railroad facility status detection information by near field communication and transmit the railroad facility status detection information; a sink node device configured to collect the railroad facility status detection information from each sensor node and transmit the railroad facility status detection information; a gateway configured to receive the railroad facility status detection information transmitted from the sink node device and perform a signal process to the received detection information by mobile communication; and a control server configured to receive the railroad facility status detection information from the gateway, output the received detection information and store the received detection information in a memory area, check a value of the received railroad facility status detection information, and output a warning message and a warning sound warning about safety abnormality of the railroad facilities when the checked value exceeds a predetermined reference value.

Such a conventional railroad monitoring system diagnoses a failure according to status detection information detected by a sensor installed at a railroad facility on the ground or in a maintenance depot. Accordingly, it is possible to diagnose a status of a railroad vehicle only at a limited location where the sensor is installed. Further, reliability of the diagnosis is low, and it is possible to diagnose only after any failure occurs. Furthermore, a failure cannot be predicted or suppressed by monitoring a status of the railroad vehicle in real time. In order to solve such a problem, a study on a method for combining a wireless sensor configured to monitor an operation status of each component in a railroad vehicle is being conducted. Further, in order to readily supply power to the wireless sensor, a study on a self-generation module configured to use various energy sources present in the railroad vehicle is also being conducted.

Energy harvesting is one representative technology for the self-generation module. The energy harvesting refers to a technology of harvesting or scavenging discarded energy from the environment and converting the energy into usable electric energy. According to the energy harvesting, natural light energy, low-temperature waste heat energy from a human body or a combustion engine, micro-vibration energy from a device mounted on/attached to a portable device, dissipation energy caused by human physical activities, and the like can be absorbed and converted into electric energy. Further, the energy harvesting may use energy harvesting elements such as a thermoelectric element, electrochemical reaction, a DC/AC generator, a piezoelectric transducer, a capacitor transducer, a photovoltaic cell, and the like. Generally, power obtained by the energy harvesting is approximately in the range of microwatt ($\mu$W) to milliwatt (mW).

Such energy harvesting can be applied to various fields. By way of example, vibration generated in a railroad vehicle or a car driving at a high speed can be utilized by using the energy harvesting, so that electric energy can be produced.

In this regard, Korean Patent Laid-open Publication No. 2013-0011471 (entitled "Broadband energy harvesting apparatus using a multi-degree-of-freedom vibrating body") discloses a technology for efficiently obtaining electric energy in a wide frequency range by vibrating a rigid body with a multi-degree of freedom to cause multiple natural frequencies to appear close to each other and thus widening a resonant frequency band with respect to external vibration.

However, the above-described conventional technology does not give consideration to both of vibration frequencies in high-speed and low-speed periods, and, thus, is limited in widening a power generating frequency band.

Meanwhile, a wireless sensor configured to monitor a status of various systems, such as a train operating system, a high-pressure system, a traction system, a braking system, an auxiliary power supply, and an in-vehicle electric device, included in a railroad vehicle can be combined with the railroad vehicle, and information sensed by the wireless sensor can be transmitted through a wireless communication path. In this case, wireless communication of the wireless sensor can be processed by using energy acquired by energy harvesting.

In this regard, U.S. Patent Laid-open Publication No. 2012-0255349 (entitled "Micro-power systems") discloses a technology of producing and managing energy using an energy harvesting structure attached to a vehicle and utilizing the produced and managed energy as electric power for operating a module for RF communication.

However, a railroad vehicle or a car driving at a high speed or a machine generating severe vibration generates severe vibration or high-temperature heat. Thus, reliability cannot be guaranteed during data transmission for wireless communication according to the above-described conventional technology.

SUMMARY

In view of the foregoing, the present disclosure provides a railroad vehicle monitoring system and method for monitoring a status of a railroad vehicle in real time by constructing a wireless sensor network including an energy harvesting in main components (i.e. attached equipment) of the railroad vehicle.

Further, an exemplary embodiment of the present disclosure provides an energy harvester configured to vibrate appropriately at a vibration frequency for a high-speed period and a vibration frequency for a low-speed period, and perform energy harvesting by using vibration energy among ambient energy sources, and provides a wireless sensor device including a communication unit combined with the energy harvester for smooth wireless communication.

Furthermore, some exemplary embodiments of the present disclosure provide a wireless sensor device including a mechanical filter which can guarantee both performance of an energy harvester which is in need of vibration for self-generation and a communication unit which is not in need of vibration for smooth wireless communication.

Moreover, some exemplary embodiments of the present disclosure provide a method for communication in a wireless sensor device including a mechanical filter capable of suppressing deterioration in wireless communication performance caused by continuous application of vibration.

However, problems to be solved by the present disclosure are not limited to the above-described problems. There may be other problems to be solved by the present disclosure.

In accordance with an exemplary embodiment of the present disclosure, there is provided a railroad vehicle monitoring system installed on a railroad vehicle. The railroad vehicle monitoring system may include: wireless sensor devices respectively installed at attached equipment of the railroad vehicle, including a sensor that senses statuses of the attached equipment, and configured to wirelessly transmit a sensing value sensed by the sensor in real time; sink node devices configured to wirelessly receive the sensing value from at least one of the wireless sensor devices and output, in real time, railroad vehicle status information obtained by integrating the received sensing value; and a vehicle status monitoring device configured to receive the railroad vehicle status information from at least one of the sink node devices, integrate and manage the railroad vehicle status information, and output the integrated railroad vehicle status information in real time.

Herein, the wireless sensor device may include an energy harvester configured to collect at least one kind of energy generated by running of the railroad vehicle, convert the collected energy into electric energy, and supply the electric energy as a power source for the sensor, a signal process with respect to the sensing value sensed by the sensor, and wireless communication of the sensing value.

Further, in accordance with another exemplary embodiment of the present disclosure, there is provided a wireless sensor device. The wireless sensor device may include: an energy harvester configured to convert vibration generated from a broadband vibration source into electricity; an elastic member arranged to receive the vibration; and a communication unit fixed by the elastic member, supplied with the converted electricity from the energy harvester, and configured to transmit sensing information obtained by sensing a measurement target.

Herein, the elastic member may operate as a mechanical filter configured to limit a range of a frequency and a magnitude of acceleration caused by the vibration for the communication unit.

The communication unit may be arranged to receive vibration passing through the elastic member.

Furthermore, in accordance with yet another exemplary embodiment of the present disclosure, there is provided an energy harvester configured to convert vibration into electricity. energy harvester may include: a first elastic part configured to vibrate in response to vibration having a first vibration frequency as a center frequency; a first mass part combined with the first elastic part; a first magnetic body combined with the first mass part; a second elastic part configured to vibrate in response to vibration having a second vibration frequency as a center frequency; a second mass part combined with the second elastic part; a second magnetic body combined with the second mass part; a central shaft combined with the first elastic part, the second elastic part, the first mass part, the second mass part, the first magnetic body, and the second magnetic body; a third elastic part combined between the first mass part and the second mass part; and a coil part which is arranged along the central shaft and into which the first magnetic body or the second magnetic body is inserted in response to vibration of the first elastic part or the second elastic part, respectively.

Herein, the first mass part may be combined with an upper surface of the third elastic part and a lower part of the first elastic part, and the first magnetic body may be combined with a partial surface of the first mass part facing an upper part of the coil part and inserted into the upper part of the coil part. The second mass part may be combined with a lower surface of the third elastic part and an upper part of the second elastic part, and the second magnetic body may be combined with a partial surface of the second mass part facing a lower part of the coil part and inserted into the lower part of the coil part.

According to any one of the above-described exemplary embodiments of the present disclosure, a monitoring system is implemented in a railroad vehicle, and, thus, it is possible to detect and diagnose a status of the vehicle in real time without delay.

Further, according to any one of the above-described exemplary embodiments of the present disclosure, it is possible to acquire railroad vehicle status information with high reliability even in a poor wireless communication environment such as driving at a high speed by using an integral wireless sensor device which enables low-power communication and energy harvesting, and it is very easy to install the wireless sensor device at all of attached equipment of the railroad vehicle.

Furthermore, according to any one of the above-described exemplary embodiments of the present disclosure, it is possible to acquire vehicle status information with more accuracy by correcting data sensed by the wireless sensor device to be optimized for a driving environment of the railroad vehicle.

Moreover, according to any one of the above-described exemplary embodiments of the present disclosure, the wireless sensor device includes an elastic member configured as a mechanical filter that limits a frequency range and an acceleration magnitude. Thus, the wireless sensor device can stably perform RF wireless communication even when being exposed to random vibration for a long time.

Further, according to any one of the above-described exemplary embodiments of the present disclosure, an energy harvester configured to supply electric power to the wireless sensor device can produce maximum energy from vibration. Thus, the wireless sensor device can stably transmit sensing information through RF wireless communication.

Furthermore, according to any one of the above-described exemplary embodiments of the present disclosure, it is possible to semipermanently use a wireless sensor network system installed on a railroad vehicle by using the energy harvester that harvest energy from vibration energy generated from a vibration source.

Moreover, according to any one of the above-described exemplary embodiments of the present disclosure, the energy harvester gives consideration to both of a vibration frequency in a high-speed period and a vibration frequency in a low-speed period. Thus, it is possible to widen a power generating frequency band.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 9 is a flowchart showing a method for performing communication of a wireless sensor device including a mechanical filter in accordance with an exemplary embodiment of the present disclosure.

DETAILED DESCRIPTION

Figure 1:
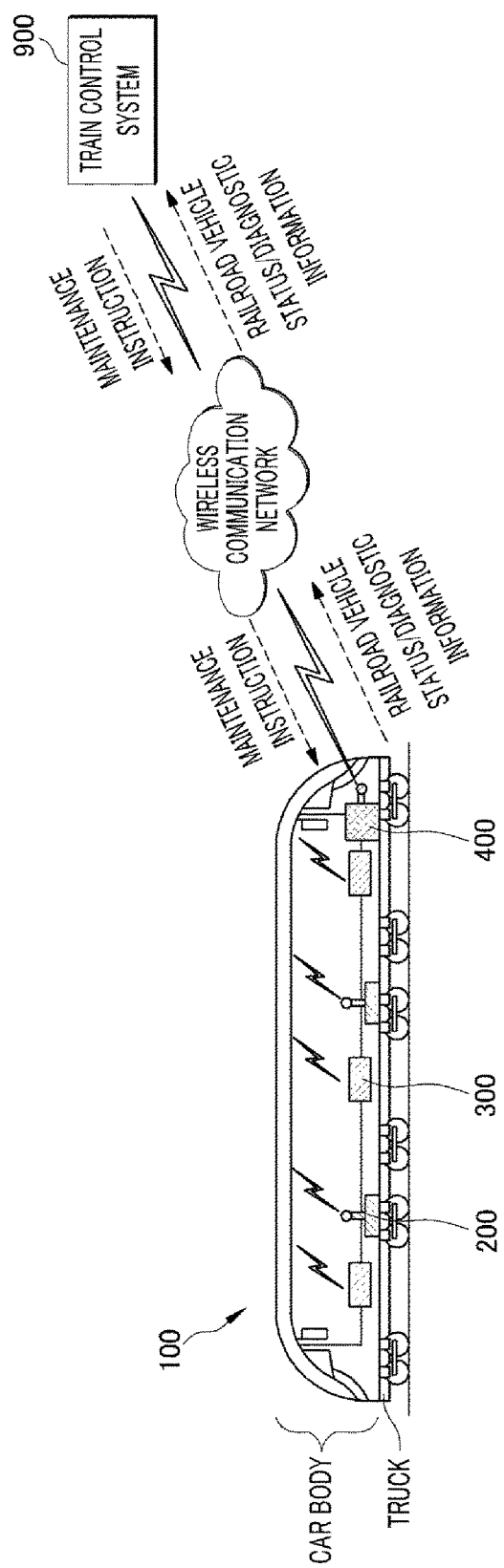
FIG. 1 illustrates a configuration of a railroad vehicle monitoring system in accordance with an exemplary embodiment of the present disclosure.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, it is to be understood that the term "comprises or includes" and/or "comprising or including" used in the document means that one or more other components, steps, operation and/or existence or addition of elements are not excluded in addition to the described components, steps, operation and/or elements unless context dictates otherwise and is not intended to preclude the possibility that one or more other features, numbers, steps, operations, components, parts, or combinations thereof may exist or may be added.

The following exemplary embodiments are provided only for understanding of the present disclosure but not intended to limit the right scope of the present disclosure. Therefore, the inventions that perform the same functions in the same scope as the present disclosure are also included in the right scope of the present disclosure.

FIG. 1 is a configuration view provided to describe a railroad vehicle monitoring system in accordance with an exemplary embodiment of the present disclosure.

As illustrated in FIG. 1, a railroad vehicle monitoring system 100 in accordance with an exemplary embodiment of the present disclosure is provided on a railroad vehicle. The railroad vehicle monitoring system 100 includes wireless sensor devices 200 respectively installed at multiple attached equipment equipped on a car body and a truck or bogie, a sink node device 300 configured to wirelessly receive sensing data from the wireless sensor devices 200, and a vehicle status monitoring device 400 configured to receive the integrated sensing data from the sink nod device 300 and wirelessly transmit the sensing data to the outside. For reference, a wireless communication network applied to an exemplary embodiment of the present disclosure may include various types of wireless communication network including a mobile communication network, and the vehicle status monitoring device 400 may transmit and receive data according to a communication protocol for each wireless communication network.

The railroad vehicle monitoring system 100 may transmit railroad vehicle status/diagnostic information including the sensing data about a status of each attached equipment to an external train control system 900. Further, the railroad vehicle monitoring system 100 may receive maintenance instruction information from the train control system 900 through the wireless communication network.

The railroad vehicle monitoring system 100 implements a wireless sensor network on a railroad vehicle, and acquires vehicle status sensing data through the low-power/energy harvesting wireless sensor devices 200 respectively installed at the attached equipment. Thus, the railroad vehicle monitoring system 100 can monitor a status of the vehicle with high reliability even in a poor wireless communication environment such as driving at a high speed. That is, in an exemplary embodiment of the present disclosure, the wireless sensor device 200 is a sensor node configured to wirelessly transmit data sensed by itself to the sink node device 300.

In FIG. 1, the train control system 900 is the general term for external control devices interworking with the railroad vehicle monitoring system 100. However, the train control system 900 may include various control devices such as a central traffic control device (CTC), a control device in each railroad station, and control devices in multiple maintenance depots.

Two or more control devices included in the train control system 900 may transmit and receive data to and from each other. By way of example, the central traffic control device (CTC) wirelessly receives railroad vehicle status and diagnostic information from the railroad vehicle monitoring system 100, diagnoses a status of the railroad vehicle on the basis of the received sensing data, and determines whether or not the inside and the outside of the railroad vehicle need maintenance. The central traffic control device (CTC) transmits a maintenance instruction to be processed in the railroad vehicle to the railroad vehicle monitoring system 100 through the wireless communication network. Further, the central traffic control device (CTC) transmits a maintenance instruction to be processed outside the railroad vehicle to a control device in a railroad station or a maintenance depot on a path on which the railroad vehicle is driving.

Hereinafter, a configuration and an operation of the railroad vehicle monitoring system 100 in accordance with an exemplary embodiment of the present disclosure will be described in detail with reference to FIG. 2 to FIG. 5.

Figure 2:
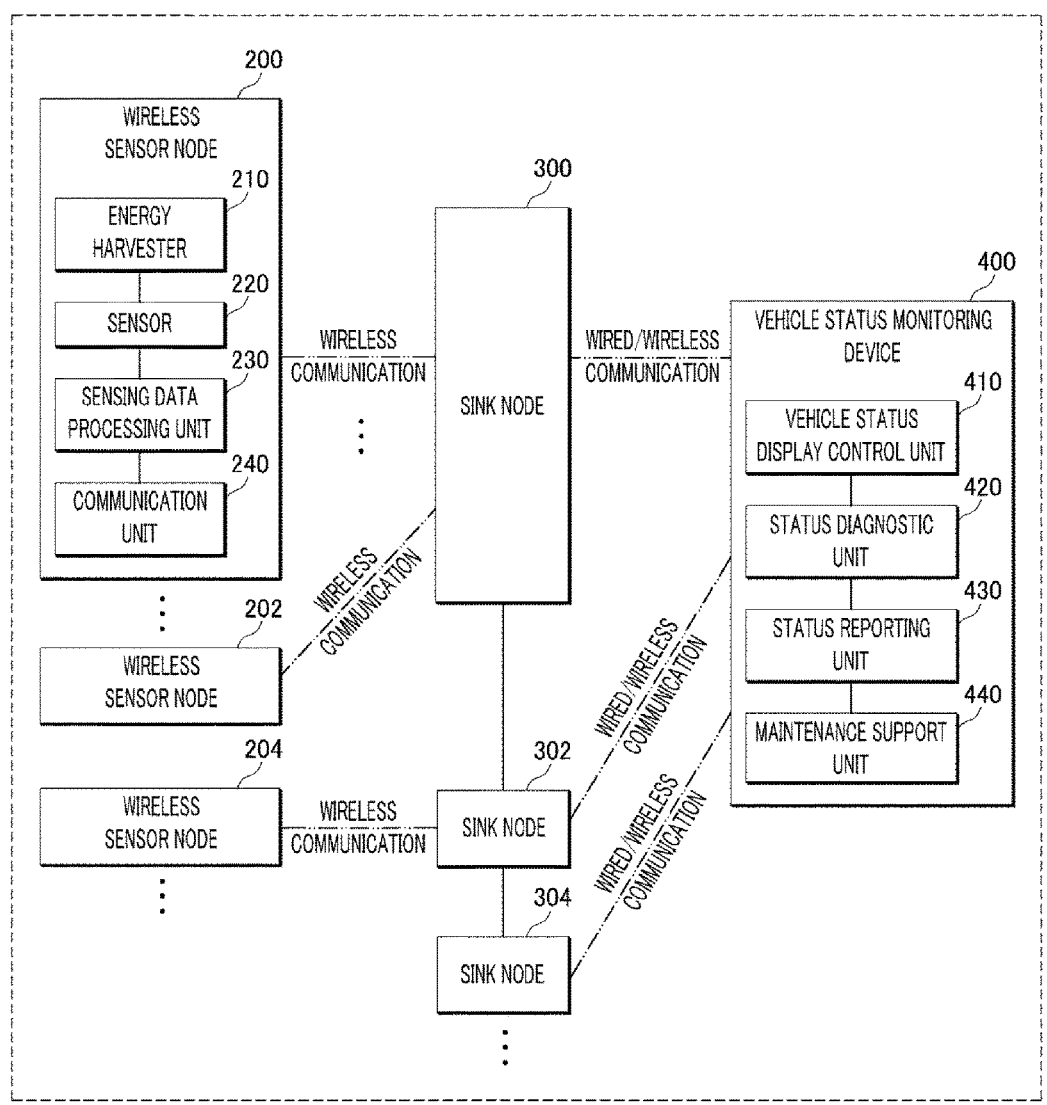
FIG. 2 is a block diagram provided to describe a configuration of a railroad vehicle monitoring system in accordance with an exemplary embodiment of the present disclosure.

FIG. 2 is a block diagram provided to describe a configuration of a railroad vehicle monitoring system in accordance with an exemplary embodiment of the present disclosure.

As illustrated in FIG. 2, the railroad vehicle monitoring system 100 in accordance with an exemplary embodiment of the present disclosure includes the wireless sensor device 200, the sink node device 300, and the vehicle status monitoring device 400.

Multiple wireless sensor devices 200, 202, and 204 are respectively provided at the attached equipment of the railroad vehicle, and include one or more sensors configured to sense a status of each attached equipment, and wirelessly transmit a sensing value sensed by each sensor in real time.

The wireless sensor device 200 includes an energy harvester 210 a sensor 220, a sensing data processing unit 230, and a communication unit 240.

The energy harvester 210 collects at least one kind of energy generated by running of the railroad vehicle, converts the energy into electric energy, and supplies the electric energy as a power source for a sensing operation, a signal process with respect to a sensing value, and wireless communication of the sensing value. By way of example, the energy harvester 210 may convert energy such as vibration and heat generated during driving of the railroad vehicle at a high speed into electric energy. A configuration of the energy harvester 210 will be described in detail later.

The sensor 220 is installed at each attached equipment of the railroad vehicle, and configured to sense a change in an operation status of each attached equipment in real time and generate a sensing value. The wireless sensor device 200 may include one or more sensors 220, and the sensors 220 may be arranged at one or more locations on the attachment.

Figure 3:
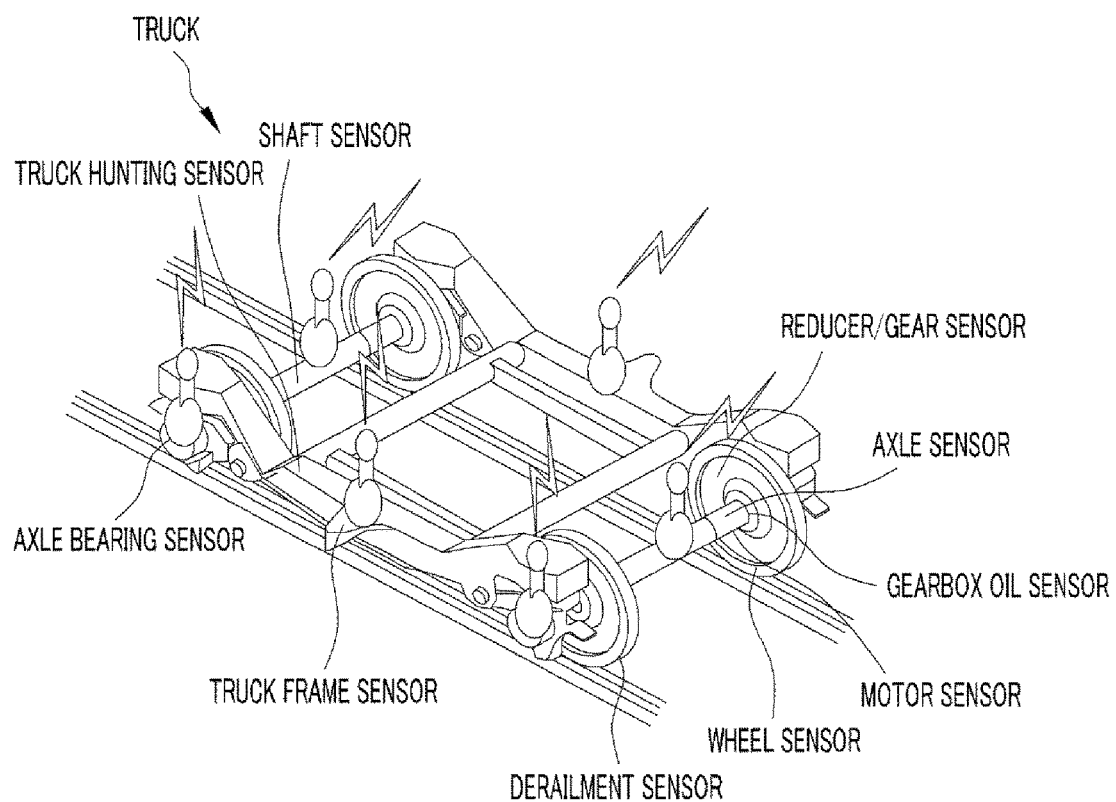
FIG. 3 is a diagram provided to describe an example of a method for installing a wireless sensor device at a railroad vehicle in accordance with an exemplary embodiment of the present disclosure.

FIG. 3 is a diagram provided to describe an example of a method for installing a wireless sensor device at a railroad vehicle in accordance with an exemplary embodiment of the present disclosure.

FIG. 3 illustrates that the wireless sensor device 200 is installed at attached equipment of the truck among the components of the railroad vehicle. FIG. 3 illustrates multiple wireless sensor devices 200 including a truck hunting sensor, a shaft sensor, an axle bearing sensor, a truck frame sensor, a derailment sensor, a wheel sensor, a gearbox oil sensor, a motor sensor, an axle sensor, and a reducer/gear sensor.

Although FIG. 3 illustrates examples of the attached equipment included in the railroad vehicle truck, the wireless sensor devices 200 may also be installed at various attached equipment (including a running gear) on the car body of the railroad vehicle.

Referring to FIG. 2 again, the sensing data processing unit 230 generates digital data from a sensing value sensed by the sensor 220.

To be specific, the sensing data processing unit 230 generates digital data by performing preset sampling process and quantization process to an original sensing value (i.e. "original data") sensed by the sensor 220. Herein, the preset sampling process and quantization process are processes performed to compress the original data sensed by the sensor 220 and wirelessly transmit the sensing data with low power.

Particularly, the sensing data processing unit 230 may update conditions for a sampling process on the basis of a vibration frequency generated during driving of the railroad vehicle. Such update is performed to transmit and receive a sensing value under optimum conditions in a wireless communication environment of the railroad vehicle driving at a high speed. Such a vibration frequency may be acquired from the energy harvester 210. Otherwise, the sensing data processing unit 230 may acquire the vibration frequency by continuously measuring vibration during driving of the railroad vehicle or by a separate measurement device (not illustrated) included therein.

The communication unit 240 wirelessly transmits the digital data (i.e. sensing value) generated by the sensing data processing unit 230 according to a preset wireless communication method. Herein, the communication unit 240 may transmit identification information of the wireless sensor device 200 together with the digital data.

By way of example, the communication unit 240 may wirelessly transmit the digital data according to a near field communication protocol in order to increase reliability in transmitting and receiving data in a communication environment such as driving of the railroad vehicle at a high speed.

The sink node device 300 wirelessly receive a sensing value from at least one wireless sensor device 200, and outputs, in real time, railroad vehicle status information obtained by integrating the received sensing value. As shown in FIG. 1, multiple sink node devices 300 may be provided on the railroad vehicle. The multiple sink node devices 300, 302, and 304 are wired/wireless integrated communication devices and may wiredly/wirelessly communicate with the other sink node devices and the vehicle status monitoring device 400. For reference, if wired communication is performed between sink node devices or between a sink node device and the vehicle status monitoring device 400, it is possible to further increase reliability in transmitting and receiving data in a poor wireless communication environment such as driving at a high speed.

The sink node device 300 receives a sensing value from at least one wireless senor device 200, matches identification information with the sensing value for each wireless sensor device 200, and generates railroad vehicle status information obtained by integrating them. Further, the sink node device 300 transmits the generated railroad vehicle status information to the vehicle status monitoring device 400 in real time.

Then, the vehicle status monitoring device 400 collects data (i.e., railroad vehicle status information) from the sink node devices 300, 302, and 304, and outputs the collected data to be displayed as having been checked. Further, the vehicle status monitoring device 400 transmits the collected data to an external device through the wireless communication network. That is, the vehicle status monitoring device 400 serves as a gateway device in the wireless sensor network. The vehicle status monitoring device 400 integrates and manages the railroad vehicle status information received from the sink node device 300, and outputs the integrated railroad vehicle status information in real time.

The vehicle status monitoring device 400 includes a vehicle status display control unit 410, a status diagnostic unit 420, a status reporting unit 430, and a maintenance support unit 440.

The vehicle status display control unit 410 outputs the integrated railroad vehicle status information through a display unit (not illustrated) installed on the railroad vehicle. For reference, the display unit (not illustrated) may be a control panel which enables a controller (or a driver) to check and control a status of the vehicle in order to control the railroad vehicle, or may be a display device (not illustrated), such as a monitor, which displays the railroad vehicle status information as discernible information.

The status diagnostic unit 420 performs a process for determining occurrence of a failure and a process for predicting a failure in each attached equipment on the basis of the railroad vehicle status information, and generates railroad vehicle diagnostic information on the basis of results of the process for determining occurrence of a failure and the process for predicting a failure.

The status diagnostic unit 420 compares the sensing value matched with the identification information of the wireless sensor device 200 included in the railroad vehicle status information with a preset reference value (hereinafter, referred to as "first threshold value") for determining occurrence of a failure in each attachment, and thus determines whether or not a failure occurs in the corresponding attachment. In this case, if the received sensing value is equal to or higher than the first threshold value, the status diagnostic unit 420 may determine that a failure occurs.

Further, the status diagnostic unit 420 compares the identification information of the wireless sensor device 200 and the sensing value with a preset reference value (hereinafter, referred to as "second threshold value") for predicting occurrence of a failure in each attachment, and thus predicts that a failure can occur in the corresponding attachment. In this case, if the received sensing value is lower than the first threshold value and equal to or higher than the second threshold value, the status diagnostic unit 420 may predict and determine that a failure may occur. For reference, the second threshold value is set to be lower than the first threshold value. Accordingly, it is possible to predict and warn about a case where a status of the corresponding attached equipment is abnormal before a failure actually occurs in the attached equipment of the railroad vehicle.

After generating the railroad vehicle diagnostic information including the results of the process for determining occurrence of a failure and the process for predicting a failure in each attached equipment of the railroad vehicle, the status diagnostic unit 420 may output the railroad vehicle diagnostic information on the display unit (not illustrated) through the vehicle status display control unit 410. Further, the status diagnostic unit 420 may wirelessly transmit the railroad vehicle diagnostic information to the train control system 900 through the status reporting unit 430.

The status reporting unit 430 wirelessly transmits at least one of the railroad vehicle status information and the railroad vehicle diagnostic information to an external control device through the wireless communication network. In this case, the status reporting unit 430 may also transmit at least one of identification information and location information of the corresponding railroad vehicle.

The maintenance support unit 440 receives maintenance instruction information from the external control device. The maintenance instruction information is information transmitted from the external control device in response to the railroad vehicle status information wirelessly transmitted from the status reporting unit 430.

In this case, the maintenance support unit 440 may transfer the received maintenance instruction information to the vehicle status display control unit 410 and control the received maintenance instruction information to be output through the display unit (not illustrated).

Meanwhile, it has been described that the vehicle status monitoring device 400 in accordance with an exemplary embodiment of the present disclosure can autonomously perform the process for determining occurrence of a failure and the process for predicting a failure in each attached equipment of the railroad vehicle by using the status diagnostic unit 420. However, the vehicle status monitoring device 400 in accordance with another exemplary embodiment of the present disclosure may transmit the integrated railroad vehicle status information to the train control system 900 and may receive and display a result of a process for determining and predicting occurrence of a failure performed by the train control system 900.

Hereinafter, a railroad vehicle monitoring method in accordance with an exemplary embodiment of the present disclosure will be described in detail with reference to FIG. 4.

Figure 4:
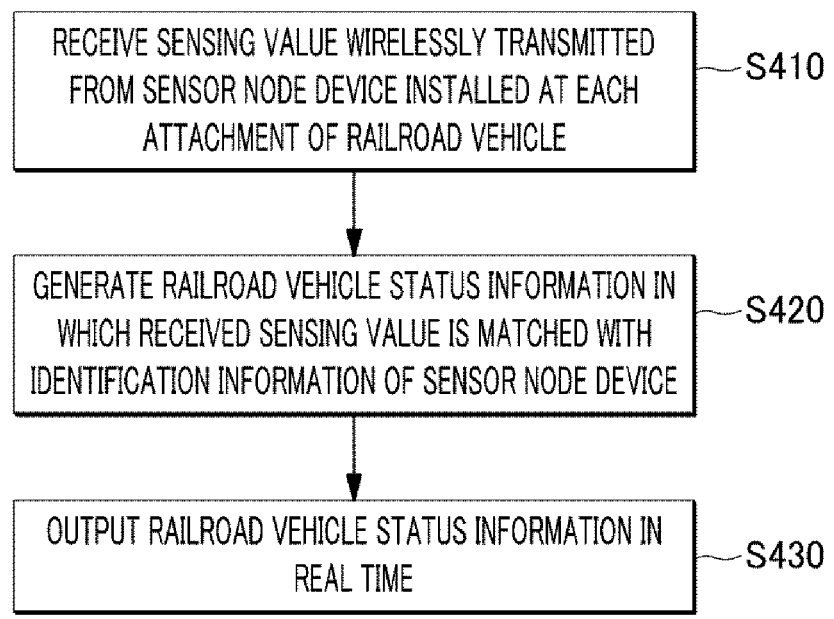
FIG. 4 is a flowchart provided to describe a railroad vehicle monitoring method in accordance with an exemplary embodiment of the present disclosure.

FIG. 4 is a flowchart provided to describe a railroad vehicle monitoring method in accordance with an exemplary embodiment of the present disclosure.

Firstly, a sensing value wirelessly transmitted from the wireless sensor device 200 installed at each attached equipment of the railroad vehicle is collected in real time (S410).

In this case, the sink node device 300 may receive a sensing value from at least one wireless sensor device 200 adjacent thereto, and at least one sink node device 300 may be installed on the railroad vehicle at a regular distance interval.

Then, railroad vehicle status information including the received sensing value and identification information of the wireless sensor device that transmits the sensing value is generated (S420).

That is, the railroad vehicle status information includes a sensing value transmitted in real time from at least one wireless sensor device 200.

Then, the railroad vehicle status information is output through a display unit on the railroad vehicle and the train control system 900 (S430).

Meanwhile, in the railroad vehicle monitoring method in accordance with an exemplary embodiment of the present disclosure, before the block S430, a process for determining and predicting occurrence of a failure in each attached equipment may be performed on the basis of the railroad vehicle status information and railroad vehicle diagnostic information may be generated on the basis of a result of the process for determining and predicting occurrence of a failure. Accordingly, in the block S430, at least one of the railroad vehicle status information and the railroad vehicle diagnostic information may be output.

To be specific, the sensing value matched with the identification information of the wireless sensor device 200 included in the railroad vehicle status information is compared with the first threshold value as the preset reference value for determining occurrence of a failure in each attachment, and, thus, it is possible to determine whether or not a failure occurs in the corresponding attachment. Further, the sensing value matched with the identification information of the wireless sensor device 200 is compared with the second threshold value as the preset reference value for predicting occurrence of a failure in each attachment, and, thus, it is possible to determine that a failure can occur in the corresponding attachment. For reference, the second threshold value is set to be lower than the first threshold value.

Further, in the railroad vehicle monitoring method in accordance with an exemplary embodiment of the present disclosure, before the block S410, the following process may be performed by each wireless sensor device 200.

To be specific, the energy harvester 210 of the wireless sensor device 200 may convert at least one kind of energy generated by running of the railroad vehicle into electric energy, and the wireless sensor device 200 may perform driving of the sensor, a signal process with respect to a sensing value sensed by the sensor, and wireless transmission of the sensing value using the electric energy as a power source. In this case, the wireless sensor device 200 may convert original data sensed by the sensor into digital data through a preset signal process (i.e., preset sampling process and quantization process. For reference, conditions for the signal process may be updated on the basis of a vibration frequency generated during driving of the railroad vehicle.

Furthermore, in the railroad vehicle monitoring method in accordance with an exemplary embodiment of the present disclosure, after the block S430, maintenance instruction information may be wirelessly received from the train control system 900 in response to the wirelessly transmitted railroad vehicle status information, and the received maintenance instruction information may be output through the display unit installed on the railroad vehicle.

Hereinafter, a detailed configuration of the wireless sensor device 200 in accordance with an exemplary embodiment of the present disclosure and the energy harvester 210 included therein will be described.

Figure 5:
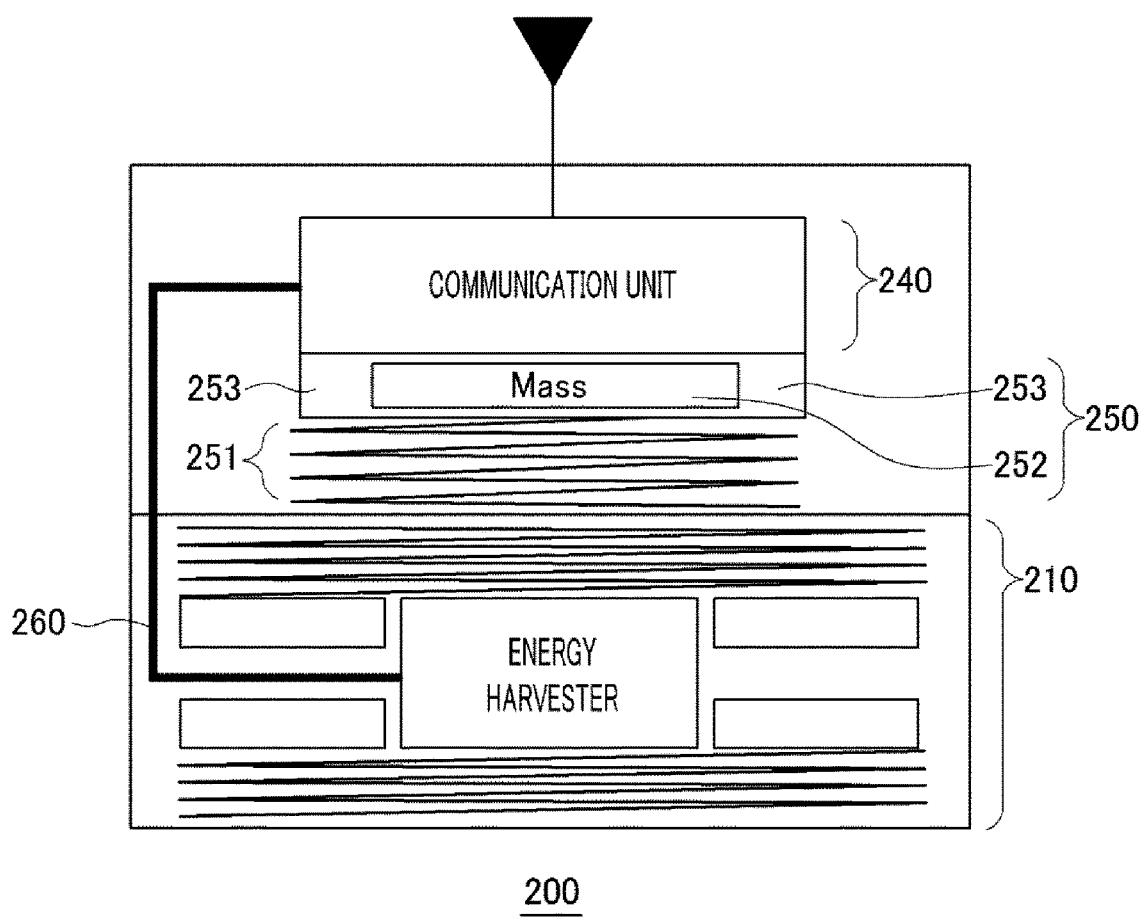
FIG. 5 is a diagram illustrating a structure of a wireless sensor device including a mechanical filter in accordance with an exemplary embodiment of the present disclosure.

FIG. 5 is a diagram illustrating a structure of a wireless sensor device including a mechanical filter in accordance with an exemplary embodiment of the present disclosure.

The wireless sensor device 200 in accordance with an exemplary embodiment of the present disclosure includes the energy harvester 210, an elastic member 250, and the communication unit 240. For reference, the sensor 220 and the sensing data processing unit 230 illustrated in FIG. 2 may be included in the communication unit 240. In this case, the communication unit 240 may include a machine control unit as the sensing data processing unit 230.

The energy harvester 210 converts vibration generated from a broadband vibration source into electricity. In this case, the energy harvester 210 may convert the vibration into electricity by using a frequency at which an average acceleration for each frequency of the vibration is maximized, and, thus, increase energy conversion efficiency. The broadband vibration source is a source of generating vibration throughout a wide frequency range, and may include a machine part, a mechanical structure, a transportation machine (a railroad vehicle, an airplane, a ship, etc.), and a rotary machine (a motor, a pump, a reducer/gearbox, a wind turbine blade, etc.).

The elastic member 250 is arranged to receive the vibration, and configured as a mechanical filter to limit a frequency range and an acceleration magnitude for the communication unit 240 to be described later. As shown in FIG. 5, the elastic member 250 may be located at an upper part of the energy harvester 210. However, a location thereof is not particularly limited as long as the elastic member 250 can receive vibration generated from the broadband vibration source. Further, the communication unit 240 may be located at an upper part of the elastic member 250.

The elastic member 250 in accordance with an exemplary embodiment of the present disclosure includes a spring 251, an elastic mass 252, and a damper 253.

The spring 251 has a natural frequency previously set according to the specifications of the communication unit 240, and limits a range of a frequency caused by the vibration from the vibration source.

Herein, as shown in the following Equation 1, a natural frequency f may be set on the basis of a mass M1 of the communication unit 240, a mass M2 of the elastic mass 252, and an intrinsic constant k of the spring. In Equation 1, m is the sum of M1 and M2.

$$f(\text{Hz}) = \frac{1}{2\pi}\sqrt{\frac{k}{m}} \qquad \text{[Equation 1]}$$

Further, in the limited frequency range, an average acceleration for each frequency of the vibration is equal to or lower than a preset reference value. The frequency range may be limited by the spring 251, and details thereof will be described later.

The elastic mass 252 is arranged on the spring 251 and may limit an acceleration magnitude. Accordingly, acceleration of vibration applied to the communication unit 240 is limited. Therefore, the communication unit 240 can more stably perform wireless communication, and, thus, it is possible to minimize reduction in sensing and communication performance of the wireless sensor device 200.

The damper 253 may limit displacement of the spring 251 and the elastic mass 252. The damper 253 is arranged around the spring 251 and the elastic mass 252 to limit the displacement thereof. Therefore, it is possible to improve an effect of limitation by the spring 251 and the elastic mass 252.

The communication unit 240 is fixed by the elastic member 250 and supplied with the converted electricity from the energy harvester 210 and wirelessly transmits sensing information measured by the sensor 220.

Figure 6:
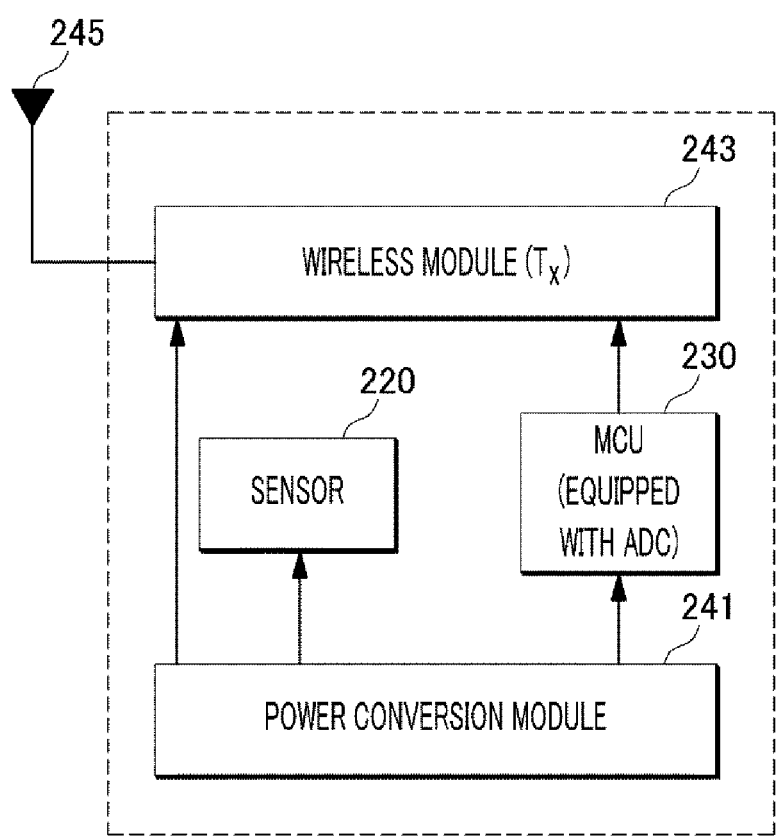
FIG. 6 is a diagram provided to describe a detailed configuration of a communication unit of a wireless sensor device in accordance with an exemplary embodiment of the present disclosure.

FIG. 6 is a diagram provided to describe a detailed configuration of a communication unit of a wireless sensor device in accordance with an exemplary embodiment of the present disclosure.

As shown in FIG. 6, the communication unit 240 includes a power conversion unit 241, the sensor 220, a machine control unit 230, a wireless communication unit 243, and an antenna 245.

The power conversion unit 241 is supplied with the converted electricity from the energy harvester 210 and distributes power suitably for each component. In this case, the power conversion unit 241 may be connected to the energy harvester 210 through a cable 260.

The sensor 220 continuously measures a status and performance of each facility (i.e., attachment) and transfers the measured sensing information to the machine control unit 230. The sensor 220 may vary in kind, shape, and specifications depending on its location. For reference, the sensor 220 may be included in the communication unit 240 as shown in FIG. 6, or may be installed outside the communication unit 240. That is, the sensor 220 may be installed at various locations where the sensor 220 can accurately monitor a status and performance of each facility, and its location is not particularly limited.

The machine control unit 230 processes the sensing information transferred from the sensor 220 and transfers the processed sensing information to the wireless communication unit 243. The machine control unit 230 may include an analog-digital converter (ADC), and the sensing information may be processed through the analog-digital converter.

The wireless communication unit 243 is connected to the antenna 245 and wirelessly transmits the sensing information through the antenna 245. The wireless communication unit 243 receives command information according to a status and performance of a facility analyzed by a manager on the basis of the transmitted sensing information, and transfers the received command information to the machine control unit 230.

Figure 7:
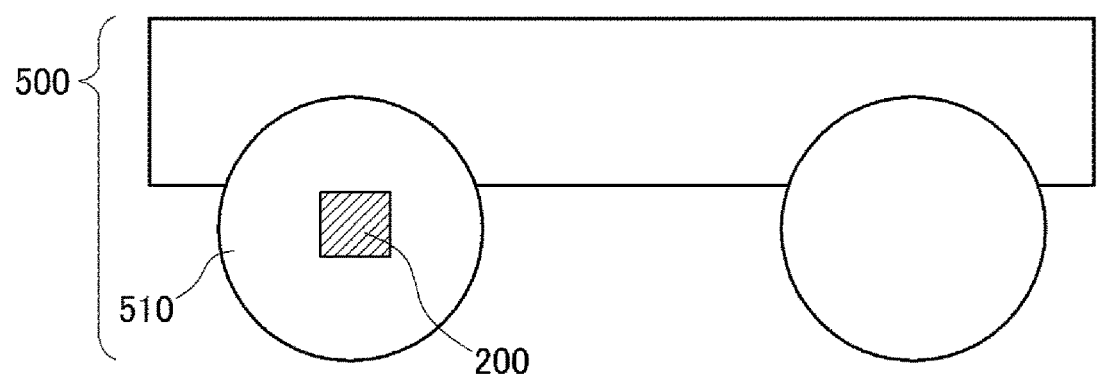
FIG. 7 is a diagram illustrating an example where a wireless sensor device in accordance with an exemplary embodiment of the present disclosure is installed at a location of a vibration source.

FIG. 7 is a diagram illustrating an example where a wireless sensor device in accordance with an exemplary embodiment of the present disclosure is installed at a location of a vibration source.

As show in FIG. 7, if the wireless sensor device 200 including the energy harvester 210 is installed at a location where vibration is generated or near the broadband vibration source, wireless communication of the communication unit 240 may be interrupted. In other words, the communication unit 240 is continuously exposed to vibration during RF wireless communication, and such vibration may reduce a data transmission/receipt rate, which may have a bad influence on the overall performance of the wireless sensor device 200.

Therefore, the wireless sensor device 200 in accordance with an exemplary embodiment of the present disclosure includes a mechanical filter with respect to vibration. That is, the wireless sensor device 200 includes the elastic member 250 configured as a mechanical filter and appropriately attenuates vibration transferred to the communication unit 240 by using the elastic member 250. Accordingly, it is possible to maintain the performance of the communication unit 240 as well as the energy harvester 210 at a certain level or more.

FIG. 8A to FIG. 8D are graphs obtained by analyzing random vibration generated in an actually driving train.

Figure 8A:
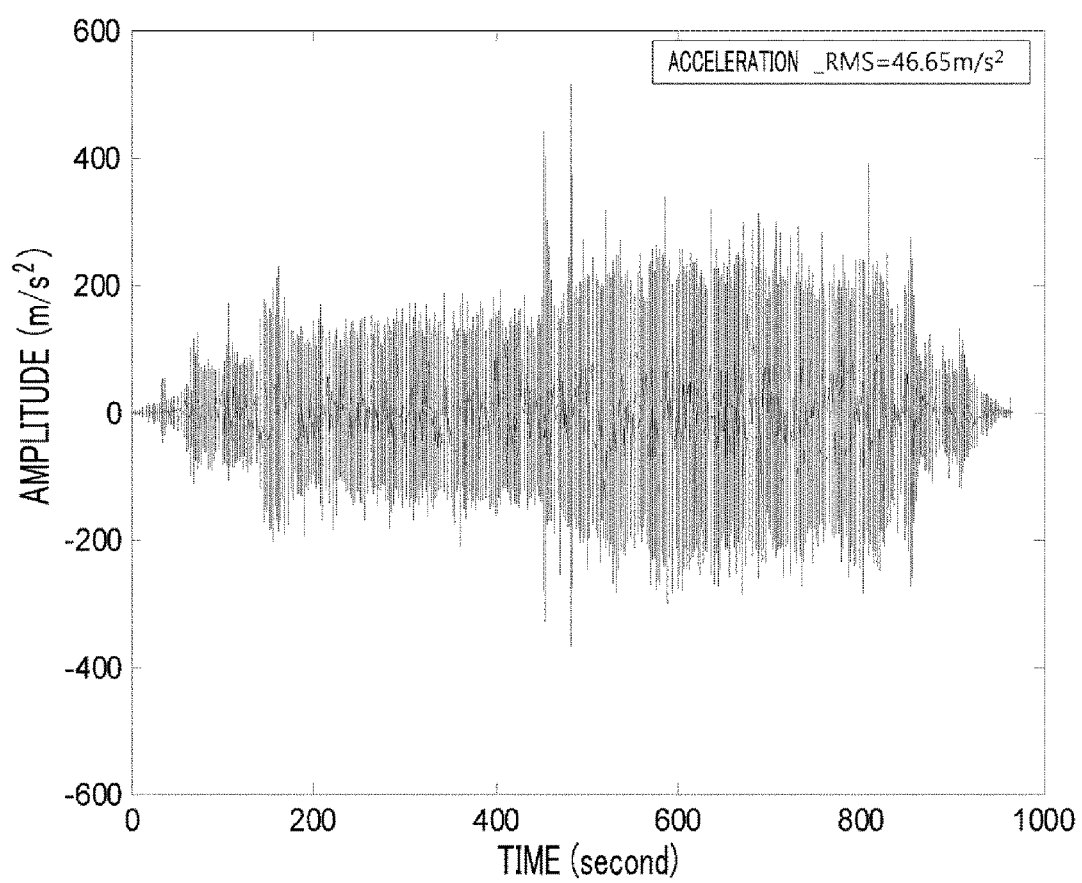
FIG. 8A is a graph obtained by analyzing random vibration generated in an actually driving train.

To be specific, FIG. 8A illustrates a vertical acceleration over time measured from an axle during driving of a train. It can be seen that the measured acceleration RMS is 46.65 m/s$^2$ and random vibration having a high acceleration occurs in a broadband at the axle during driving of the train.

Figure 8B:
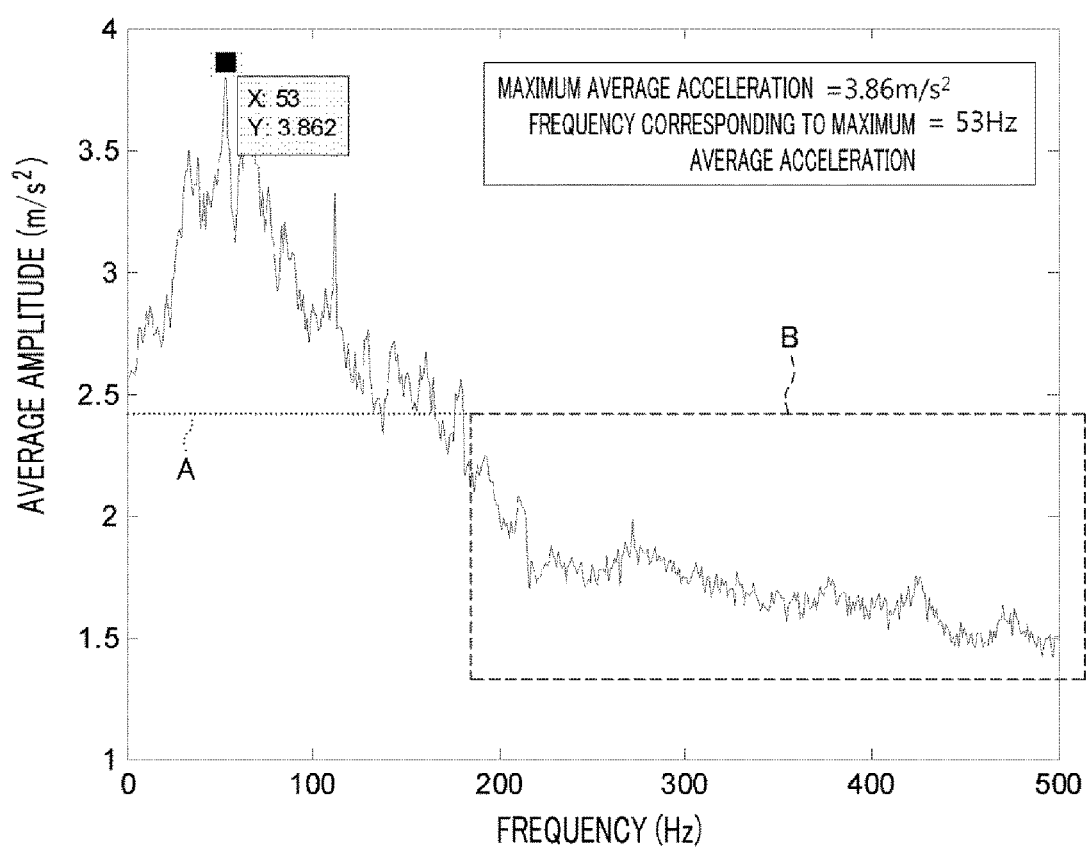
FIG. 8B is a graph obtained by analyzing random vibration generated in an actually driving train.

FIG. 8B illustrates an average acceleration for each frequency of the random vibration, and the average acceleration is a FFT result of the data shown in FIG. 8A. FIG. 8B illustrates an average value of acceleration generated at each frequency during the whole time of driving. It can be seen that during the whole time of driving, the maximum average acceleration is 3.86 m/s$^2$ and a frequency corresponding to the maximum average acceleration is 53 Hz.

Herein, the energy harvester 210 can convert the vibration into electricity by using the frequency of 53 Hz, and, thus, increase energy conversion efficiency. Further, a frequency range may be limited by the elastic member 250 or the spring 251 such that an average acceleration for each frequency of the random vibration is equal to or lower than a preset reference value A. That is, the elastic member 250 may serve as a mechanical filter that limits a frequency range to a frequency domain B of about 200 Hz or more. The vibration having the limited frequency range is transferred to the communication unit 240, and the spring 251, the elastic mass 252, and the damper 253 operate together. Thus, it is possible to guarantee the performance of the communication unit 240 at a certain level or more.

Figure 8C:
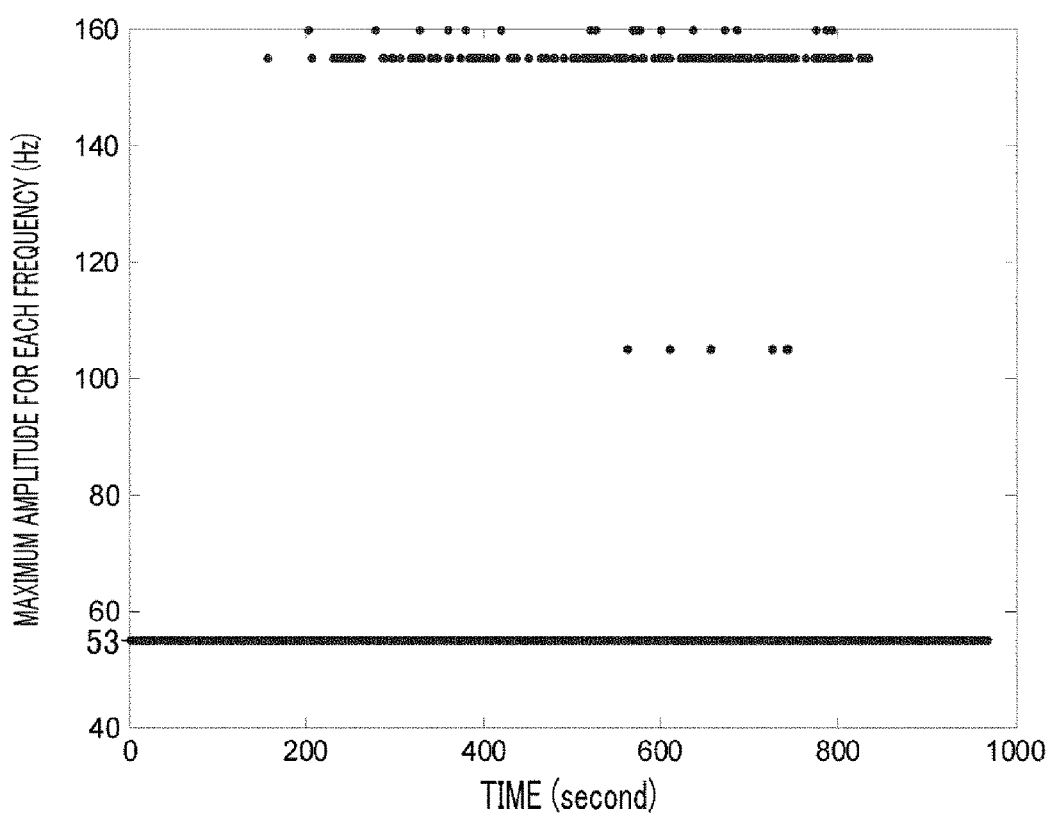
FIG. 8C is a graph obtained by analyzing random vibration generated in an actually driving train.
Figure 8D:
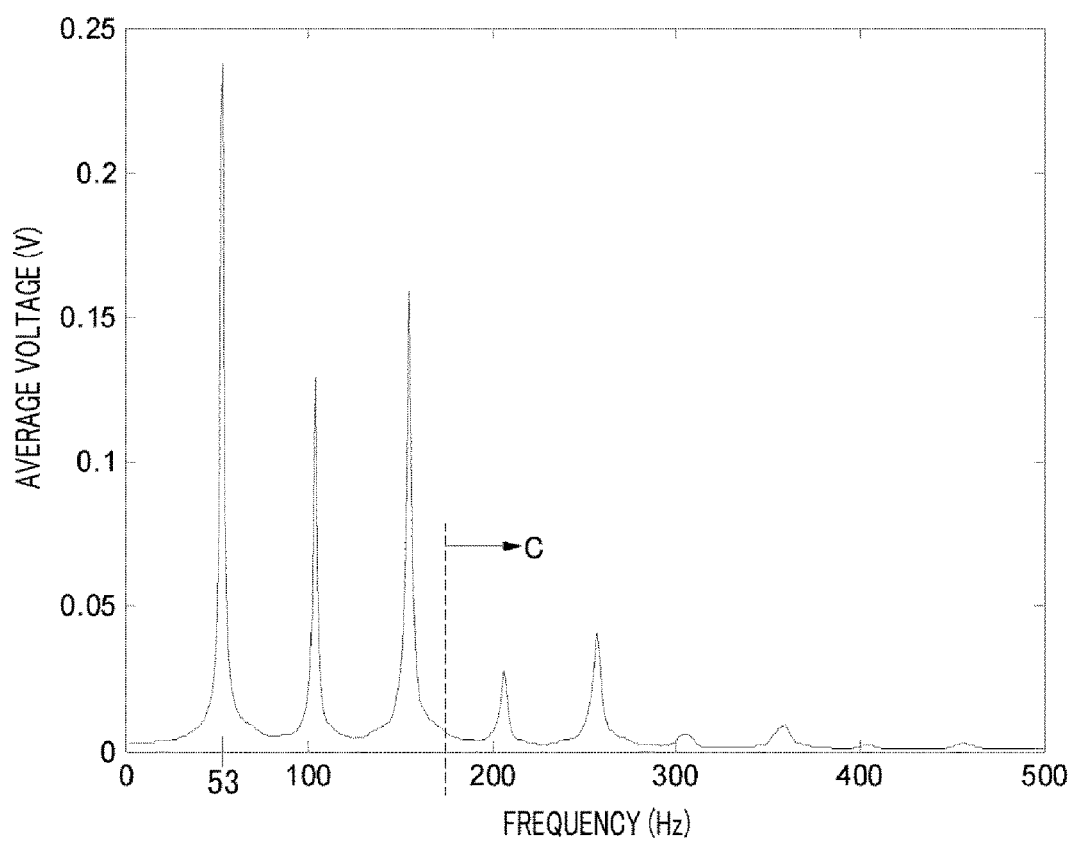
FIG. 8D is a graph obtained by analyzing random vibration generated in an actually driving train.

Further, FIG. 8C illustrates a frequency filtering effect of the elastic member 250, and FIG. 8D illustrates an average voltage for each frequency. It can be seen that after about 53 Hz, an average voltage peak value in a frequency domain C is a harmonic component and set to be lower than an average voltage value at 53 Hz.

Hereinafter, a method for performing communication of the wireless sensor device 200 including the mechanical filter in accordance with an exemplary embodiment of the present disclosure through the energy harvester 210 will be described with reference to FIG. 9.

FIG. 9 is a flowchart showing a method for performing communication of a wireless sensor device including a mechanical filter in accordance with an exemplary embodiment of the present disclosure.

Firstly, the wireless sensor device 200 is operated by being supplied with electricity generated from the broadband vibration source and converted by the energy harvester 210 (S910).

Then, the communication unit 240 of the wireless sensor device 200 fixed by the elastic member 250 transmits sensing information transferred from the sensor 220 (S920).

Herein, the elastic member 250 is configured as a mechanical filter to limit a frequency range and an acceleration magnitude and thus transfers vibration passing through the mechanical filter to the communication unit 240. Accordingly, even when being exposed to random vibration for a long time, the performance of the communication unit 240 can be maintained at a certain level or more. Further, the elastic member 250 may limit a frequency range such that an average acceleration for each frequency of vibration is equal to or lower than a preset reference value.

As described above, according to the method for performing communication of the wireless sensor device 200 including the mechanical filter, the communication unit 240 receives vibration passing through the mechanical filter and thus can stably perform RF wireless communication at a certain level or more.

Hereinafter, exemplary embodiments of the energy harvester 210 configured to supply electricity to the wireless sensor device 200 will be described in detail. For reference, in FIG. 10 to FIG. 16, different reference numerals are used to clearly explain components of the energy harvester 210 in each exemplary embodiment.

Figure 10:
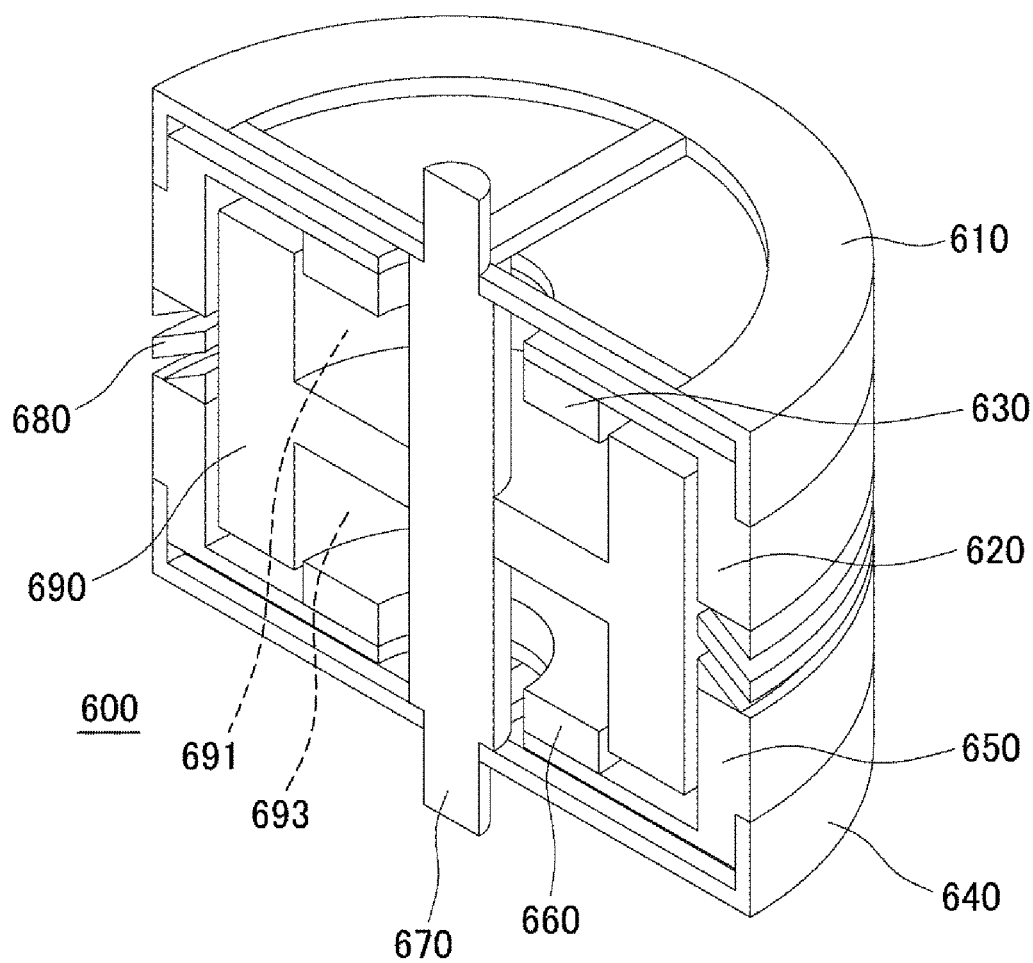
FIG. 10 is a cross-sectional perspective view of an energy harvester included in a wireless sensor device in accordance with an exemplary embodiment of the present disclosure.
Figure 11:
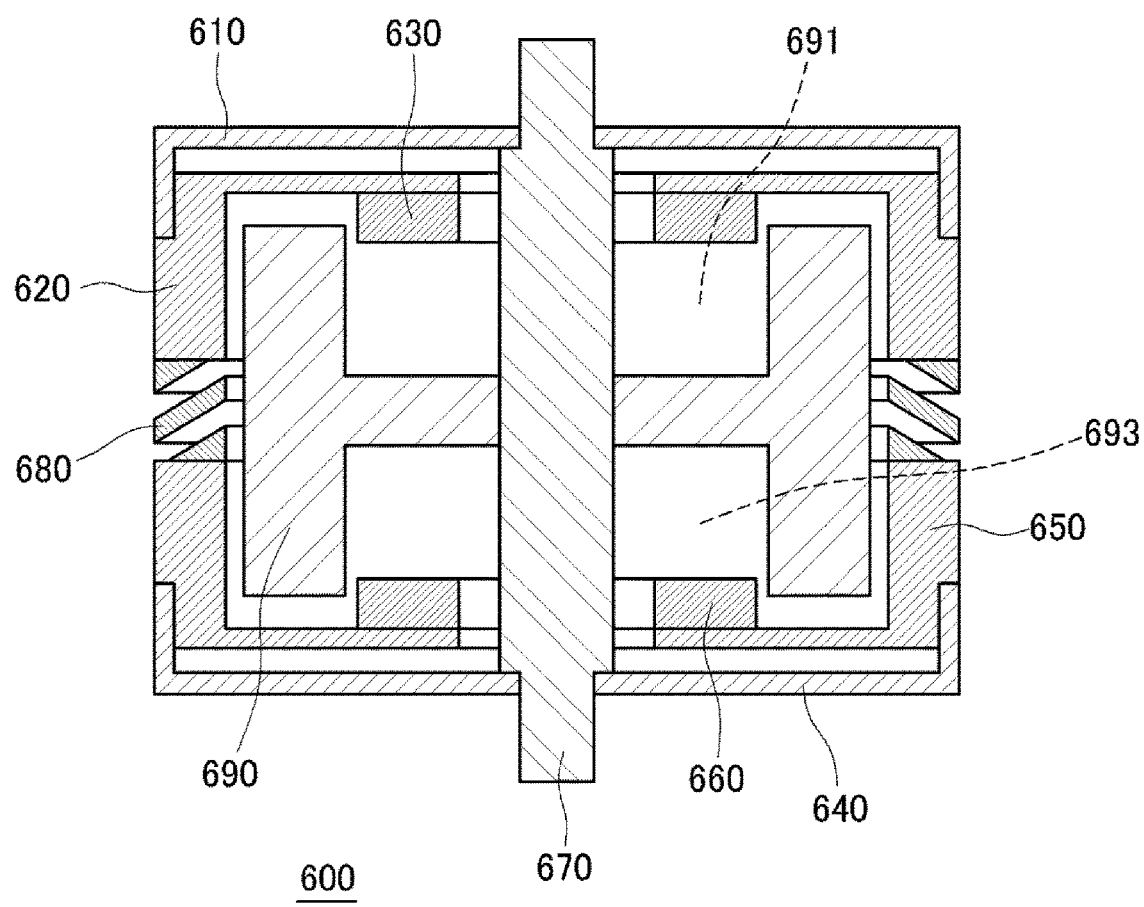
FIG. 11 is a cross-sectional front view of an energy harvester included in a wireless sensor device in accordance with an exemplary embodiment of the present disclosure.
Figure 12:
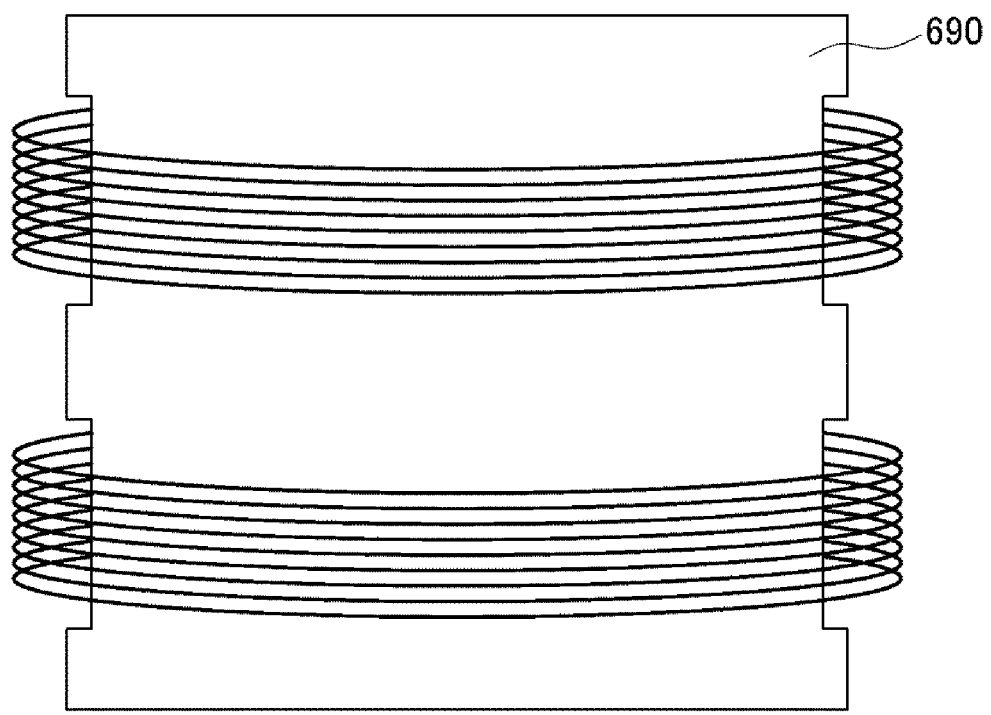
FIG. 12 is a diagram illustrating a coil part of an energy harvester included in a wireless sensor device in accordance with an exemplary embodiment of the present disclosure.

FIG. 10 is a cross-sectional perspective view of an energy harvester in accordance with an exemplary embodiment of the present disclosure, FIG. 11 is a cross-sectional front view of an energy harvester in accordance with an exemplary embodiment of the present disclosure, and FIG. 12 is a diagram illustrating a coil part included in an energy harvester in accordance with an exemplary embodiment of the present disclosure.

As shown in FIG. 10 and FIG. 11, an energy harvester 600 in accordance with an exemplary embodiment of the present disclosure includes a first elastic part 610, a first mass part 620, a first magnetic body 630, a second elastic part 640, a second mass part 650, a second magnetic body 660, a central shaft 670, a third elastic part 680, and a coil part 690.

The energy harvester 600 converts vibration generated from a broadband vibration source into electricity. The broadband vibration source is a source of generating vibration throughout a wide frequency range, and may include a machine part, a mechanical structure or a transportation machine (a railroad vehicle, an airplane, a ship, etc.) and a rotary machine (a motor, a pump, a plant, a factory, a reducer/gearbox, a wind turbine blade, etc.).

The first elastic part 610 is designed to vibrate in response to vibration having a first vibration frequency as a center frequency. That is, the first elastic part 610 is designed to have a first elastic modulus k1 with the first vibration frequency as a center frequency and thus responds to vibration.

The first mass part 620 is combined with the first elastic part 610, and the first magnetic body 630 is combined with the first mass part 620. Since the first mass part 620 is combined with the first elastic part 610, the first mass part 620 vibrates when the first elastic part 610 vibrates. Herein, since the first magnetic body 630 is combined with the first mass part 620, the first magnetic body 630 vibrates when the first mass part 620 vibrates, and is inserted into the coil part 690.

The second elastic part 640 is designed to vibrate in response to vibration having a second vibration frequency as a center frequency. That is, the second elastic part 640 is designed to have a second elastic modulus k2 with the second vibration frequency as a center frequency and thus responds to vibration.

The second mass part 650 is combined with the second elastic part 640, and the second magnetic body 660 is combined with the second mass part 650. Since the second mass part 650 is combined with the second elastic part 640, the second mass part 650 vibrates when the second elastic part 640 vibrates in response to vibration having the second vibration frequency as a center frequency. Herein, since the second magnetic body 660 is combined with the second mass part 650, the second magnetic body 650 vibrates when the second mass part 650 vibrates, and is inserted into the coil part 690.

Meanwhile, if the first vibration frequency may be a vibration frequency corresponding to a preset first speed or more, the second vibration frequency may be a vibration frequency corresponding to a preset second speed or less. Herein, the first speed may have a higher speed value than the second speed.

As described above, the energy harvester 600 in accordance with an exemplary embodiment of the present disclosure gives consideration to both of a vibration frequency in a high-speed period and a vibration frequency in a low-speed period. Thus, it is possible to widen a power generating frequency band.

Further, the energy harvester 600 in accordance with an exemplary embodiment of the present disclosure can be applied to an environment where a center frequency fluctuates as well as an environment where a high-speed period and a low-speed period are clearly separated. In the case of a transportation machine such as a railroad vehicle, a car, or the like, as a speed of the transportation machine is changed, a center frequency may be changed. Further, in the case of a rotary machine such as a motor, a pump, or the like, when a high operating load is applied to the rotary machine, a variation frequency is changed. The energy harvester 600 in accordance with an exemplary embodiment of the present disclosure can be applied to the environment where a center frequency fluctuates. As such, the energy harvester 600 can produce electric power under various conditions such as application of a frequency in a wide range or application of a dual frequency.

Meanwhile, the first elastic part 610, the second elastic part 640, the first mass part 620, the second mass part 650, the first magnetic body 630, and the second magnetic body 660 are combined with the central shaft 670.

Herein, the first elastic part 610, the second elastic part 640, the first mass part 620, the second mass part 650, the first magnetic body 630, and the second magnetic body 660 may be formed into a cylindrical shape including an opening through which the central shaft 670 passes. Further, outer surfaces of the first elastic part 610 and the second elastic part 640 may be formed into a radial shape, for example, extended crosswise from the central shaft 670.

Meanwhile, the cylindrical shape including the opening is just an example, and a shape may vary depending on a shape of a vibration source and a purpose. Further, the first elastic part 610 and the second elastic part 640 may be formed into various shapes in addition to the crossed radial shape.

Further, the first mass part 620 and the second mass part 650 may be formed to be separated with a preset distance from the coil part 690. Since they are formed to be separated from the coil part 690, the first magnetic body 630 or the second magnetic body 660 may be inserted into the coil part 690 when the first mass part 620 or the second mass part 650 vibrates.

The third elastic part 680 is combined between the first mass part 620 and the second mass part 650. Herein, an upper surface of the third elastic part 680 may be combined with the first mass part 620, and a lower surface of the third elastic part 680 may be combined with the second mass part 650. The first mass part 620 combined with the upper surface of the third elastic part 680 may be combined with a lower part of the first elastic part 610, and the first magnetic body 630 may be combined with a lower part of a flange of the first mass part 620 (a part facing an upper part of the coil part 690) and inserted into the upper part of the coil part 690. Further, the second mass part 650 combined with the lower surface of the third elastic part 680 may be combined with an upper part of the second elastic part 640, and the second magnetic body 660 may be combined with an upper part of a flange of the second mass part 650 (a part facing a lower part of the coil part 690) and inserted into the lower part of the coil part 690.

Referring to FIG. 12, the coil part 690 is arranged along the central shaft 670 and formed in order for the first magnetic body 630 or the second magnetic body 660 to be inserted in response to vibration of the first elastic part 610 or the second elastic part 640, respectively.

That is, if vibration having the first vibration frequency as a center frequency is generated, when the first elastic part 610 vibrates, the first magnetic body 630 combined with the first mass part 620 is selectively inserted into the coil part 690. If vibration having the second vibration frequency as a center frequency is generated, when the second elastic part 640 vibrates, the second magnetic body 660 combined with the second mass part 650 is selectively inserted into the coil part 690. Herein, selective insertion of the first magnetic body 630 or second magnetic body 660 means that if vibration having the first vibration frequency or second vibration frequency as a center frequency is generated from a vibration source, the first magnetic body 630 or second magnetic body 660 is repeatedly inserted into the coil part 690 and withdrawn from the coil part 690.

Herein, the coil part 690 may include hollow parts 691 and 693 respectively formed on one surface where the first magnetic body 630 is inserted and the other surface where the second magnetic body 660 is inserted. Accordingly, the first magnetic body 630 and the second magnetic body 660 may be selectively inserted into the coil part 690. Although the coil part 690 illustrated in FIG. 10 and FIG. 11 includes the hollow parts 691 and 693, into which the first magnetic body 630 and the second magnetic body 660 are inserted, as being separated from each other, the present disclosure is not limited thereto. A single hollow part may be formed, and the first magnetic body 630 and the second magnetic body 660 may be selectively inserted into the single hollow part.

Further, the coil part 690 may include: a first groove formed along an inner peripheral surface of the first mass part 620; a second groove formed along an inner peripheral surface of the second mass part 650; and coils respectively wound on the first grove and the second groove. That is, the coil part 690 may be formed into a bobbin shape.

As such, the coil part 690 includes the hollow parts 691 and 693 into which the first magnetic body 630 and the second magnetic body 660 can be inserted, and is formed into a bobbin shape and wound with the coils. Therefore, the first magnetic body 630 and the second magnetic body 660 are selectively inserted in response to vibration, and, thus, vibration generated from the vibration source can be converted into electricity.

Figure 13:
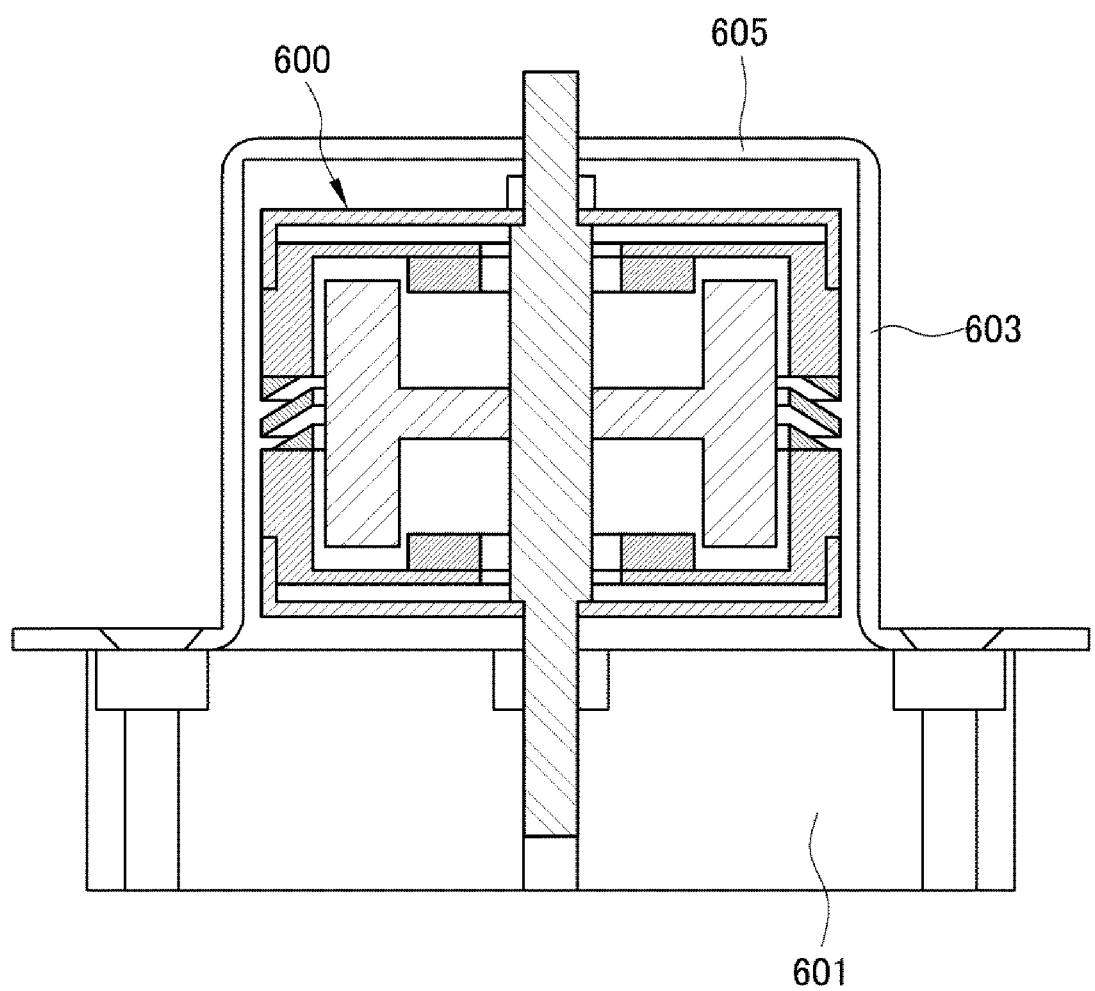
FIG. 13 is a diagram illustrating that an energy harvester included in a wireless sensor device is combined with a supporting plate in accordance with an exemplary embodiment of the present disclosure.

FIG. 13 is a diagram illustrating that an energy harvester 600 is combined with a supporting plate in accordance with an exemplary embodiment of the present disclosure.

The energy harvester 600 is combined with a supporting plate, and can be installed and fixed to the vibration source through the supporting plate. The energy harvester 600 may include a lower supporting plate 601, a lateral supporting plate 603, and an upper supporting plate 605.

The lower supporting plate 601 may be installed and fixed to the vibration source, connected to the central shaft 670 as being fixed thereto, and also formed to be separated from the second elastic part 640. Further, the lateral supporting plate 603 may be connected to the lower supporting plate 601 and formed to be separated from peripheral surfaces of the first mass part 620 and the second mass part 650. The upper supporting plate 605 is connected to the central shaft 670 as being fixed thereto, connected to the lateral supporting plate 603, and also formed to be separated from the first elastic part 610.

Figure 14:
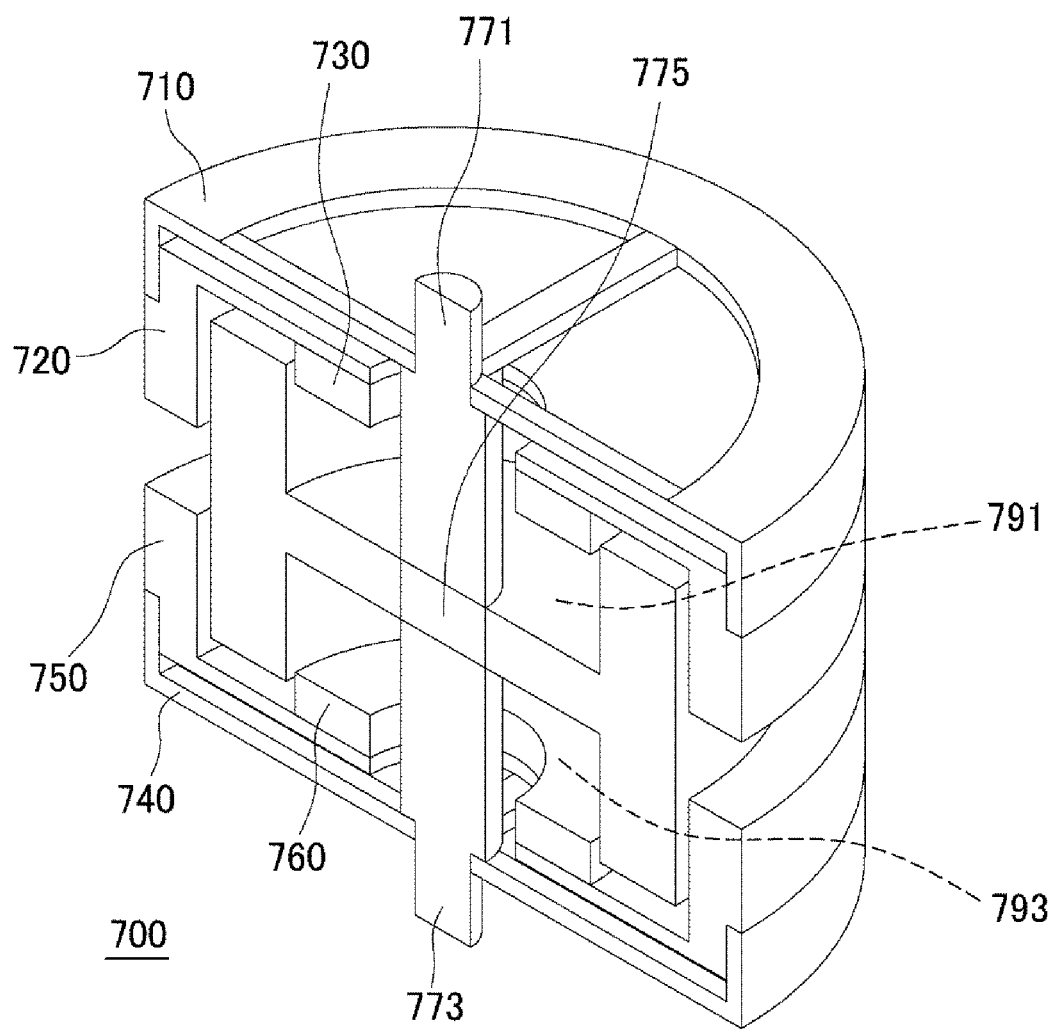
FIG. 14 is a cross-sectional perspective view of an energy harvester in accordance with another exemplary embodiment of the present disclosure.
Figure 15:
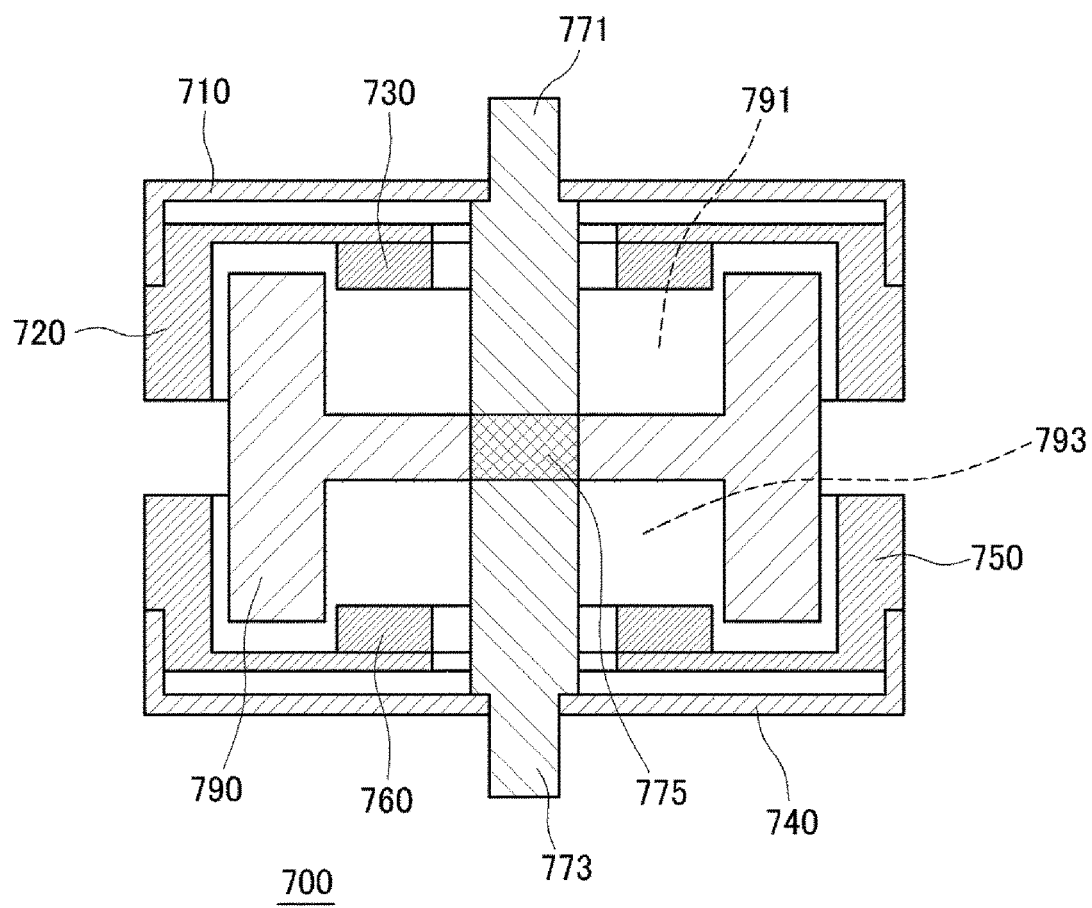
FIG. 15 is a front view of an energy harvester in accordance with another exemplary embodiment of the present disclosure.

FIG. 14 is a cross-sectional perspective view of an energy harvester 700 in accordance with another exemplary embodiment of the present disclosure, and FIG. 15 is a front view of the energy harvester 700 in accordance with another exemplary embodiment of the present disclosure.

As shown in FIG. 14 and FIG. 15, an energy harvester 700 in accordance with another exemplary embodiment of the present disclosure includes a first central shaft 771, a first elastic part 710, a first mass part 720, a first magnetic body 730, a second central shaft 773, a second elastic part 740, a second mass part 750, a second magnetic body 760, a damping unit 775, and a coil part 790.

In the energy harvester 700, a central shaft is formed to be separated into the first central shaft 771 and the second central shaft 773 arranged along the same axis as the first central shaft 771. Further, in the energy harvester 700, the damping unit 775 configured to connect the first central shaft 771 and the second central shaft 773 is formed instead of the third elastic part 680 of the energy harvester 600 illustrated in FIG. 10 to FIG. 13. The damping unit 775 can absorb vibration generated from a vibration source.

The first elastic part 710 is arranged along the first central shaft 771 and designed to vibrate in response to vibration having the first vibration frequency as a center frequency. That is, the first elastic part 710 is designed to have a first elastic modulus k1 and thus responds to the vibration having the first vibration frequency as a center frequency.

The first mass part 620 is arranged along the first central shaft 771 and combined with the first elastic part 710. The first magnetic body 730 is arranged along the first central shaft 771 and combined with the first mass part 720. Since the first mass part 720 is combined with the first elastic part 710, the first mass part 720 vibrates when the first elastic part 710 vibrates. Herein, since the first magnetic body 730 is combined with the first mass part 720, the first magnetic body 730 vibrates when the first mass part 720 vibrates, and is selectively inserted into the coil part 790.

The second elastic part 740 is arranged along the second central shaft 773 and designed to vibrate in response to vibration having a second vibration frequency as a center frequency. That is, the second elastic part 740 is designed to have a second elastic modulus k2 and thus responds to the vibration having the second vibration frequency as a center frequency.

The second mass part 750 is arranged along the second central shaft 773 and combined with the second elastic part 740. The second magnetic body 760 is arranged along the second central shaft 773 and combined with the second mass part 750. Since the second mass part 750 is combined with the second elastic part 740, the second mass part 750 vibrates when the second elastic part 740 vibrates in response to the vibration having the second vibration frequency as a center frequency. Herein, since the second magnetic body 760 is combined with the second mass part 750, the second magnetic body 760 vibrates when the second mass part 750 vibrates, and is inserted into the coil part 790.

The first elastic part 710, the second elastic part 740, the first mass part 720, the second mass part 750, the first magnetic body 730, and the second magnetic body 760 may be formed into a cylindrical shape including an opening through which the first central shaft 771 or the second central shaft 773 passes. However, the cylindrical shape including the opening is just an example, and a shape may vary depending on a shape of a vibration source and a purpose.

Further, outer surfaces of the first elastic part 710 and the second elastic part 740 may be formed into a radial shape, for example, extended crosswise from the first central shaft 771 and the second central shaft 773. However, the first elastic part 710 and the second elastic part 740 may be formed into various shapes in addition to the crossed radial shape.

The coil part 790 is arranged along the first central shaft 771 and the second central shaft 773, and the first magnetic body 730 or the second magnetic body 740 is selectively inserted in response to vibration of the first elastic part 710 or the second elastic part 740, respectively. Herein, selective insertion means that if vibration having the first vibration frequency or second vibration frequency as a center frequency is generated from a vibration source, the first magnetic body 730 or second magnetic body 760 is repeatedly inserted into the coil part 790 and withdrawn from the coil part 790.

The coil part 790 may include hollow parts 791 and 793 respectively formed on one surface where the first magnetic body 730 is inserted and the other surface where the second magnetic body 760 is inserted. Accordingly, the first magnetic body 730 and the second magnetic body 760 may be selectively inserted into the coil part 790. Although the coil part 790 illustrated in FIG. 14 and FIG. 15 includes the hollow parts 791 and 793, into which the first magnetic body 730 and the second magnetic body 760 are inserted, as being separated from each other, the present disclosure is not limited thereto. A single hollow part may be formed, and the first magnetic body 730 and the second magnetic body 760 may be selectively inserted into the single hollow part.

Further, the coil part 790 may include: a first groove formed along an inner peripheral surface of the first mass part 720; a second groove formed along an inner peripheral surface of the second mass part 750; and coils respectively wound on the first grove and the second groove. That is, the coil part 790 may be formed into a bobbin shape as shown in FIG. 12.

Further, the coil part 790 may be formed to be separated with a preset distance from the first mass part 720 and the second mass part 750. Since the coil part 790 is formed to be separated from the first mass part 720 and the second mass part 750, the first magnetic body 730 or the second magnetic body 760 may be selectively inserted into the coil part 790 when the first mass part 720 or the second mass part 750 vibrates.

As such, the coil part 790 includes the hollow parts 791 and 793 into which the first magnetic body 730 and the second magnetic body 760 can be inserted, and is formed into a bobbin shape and wound with the coils. Therefore, the first magnetic body 730 and the second magnetic body 760 are selectively inserted in response to vibration, and, thus, vibration generated from the vibration source can be converted into electricity.

Meanwhile, if the first vibration frequency may be a vibration frequency corresponding to a preset first speed or more, the second vibration frequency may be a vibration frequency corresponding to a preset second speed or less. Herein, the first speed may have a higher speed value than the second speed. As described above, the energy harvester 700 in accordance with another exemplary embodiment of the present disclosure gives consideration to both of a vibration frequency in a high-speed period and a vibration frequency in a low-speed period. Thus, it is possible to widen a power generating frequency band.

Further, the energy harvester 700 in accordance with another exemplary embodiment of the present disclosure can be applied to the environment where a center frequency fluctuates as well as an environment where a high-speed period and a low-speed period are clearly separated. Thus, the energy harvester 700 can produce electric power under various conditions such as application of a frequency in a wide range or application of a dual frequency.

The energy harvester 700 is combined with a supporting plate, and can be installed and fixed to the vibration source through the supporting plate. In order to do so, the energy harvester 700 may include a lower supporting plate, a lateral supporting plate, and an upper supporting plate.

The lower supporting plate may be installed and fixed to the vibration source, connected to the second central shaft 773 as being fixed thereto, and also formed to be separated from the second elastic part 740. Further, the lateral supporting plate may be connected to the lower supporting plate and formed to be separated from peripheral surfaces of the first mass part 720 and the second mass part 750. The upper supporting plate is connected to the first central shaft 771 as being fixed thereto, connected to the lateral supporting plate, and also formed to be separated from the first elastic part 710.

For reference, a shape in which the energy harvester 700 in accordance with another exemplary embodiment of the present disclosure is combined with the supporting plates may be identical or similar to the shape as illustrated in FIG. 12.

Meanwhile, a stacked structure of the energy harvester 700 may be formed as follows.

One surface of the damping unit 775 may be connected to a lower surface of the first central shaft 771, and the other surface of the damping unit 775 may be connected to an upper surface of the second central shaft 773. Further, the first mass part 720 may be combined with a lower part of the first elastic part 710, and the first magnetic body 730 may be combined with a lower part of a flange of the first mass part 720 (a part facing an upper part of the coil part 790) and inserted into the upper part of the coil part 790. Further, the second magnetic body 760 may be combined with an upper part of the second mass part 750, and the second magnetic body 760 may be combined with an upper part of a flange of the second mass part 750 (a part facing a lower part of the coil part 790) and inserted into the lower part of the coil part 790.

That is, in an upper part of the energy harvester 700, the first elastic part 710, the first mass part 720, and the first magnetic body 730 may be combined in sequence around the first central shaft 771, and in a lower part of the energy harvester 700, the second elastic part 740, the second mass part 750, and the second magnetic body 760 may be combined in sequence around the second central shaft 773. Further, the damping unit 775 is connected between the first central shaft 771 and the second central shaft 773. However, a stacking sequence of the energy harvester 700 is not limited thereto. The combinations in the upper part and the lower part may be reversed, or the energy harvester 700 may have a stacked structure in various forms depending on a purpose of use.

Figure 16:
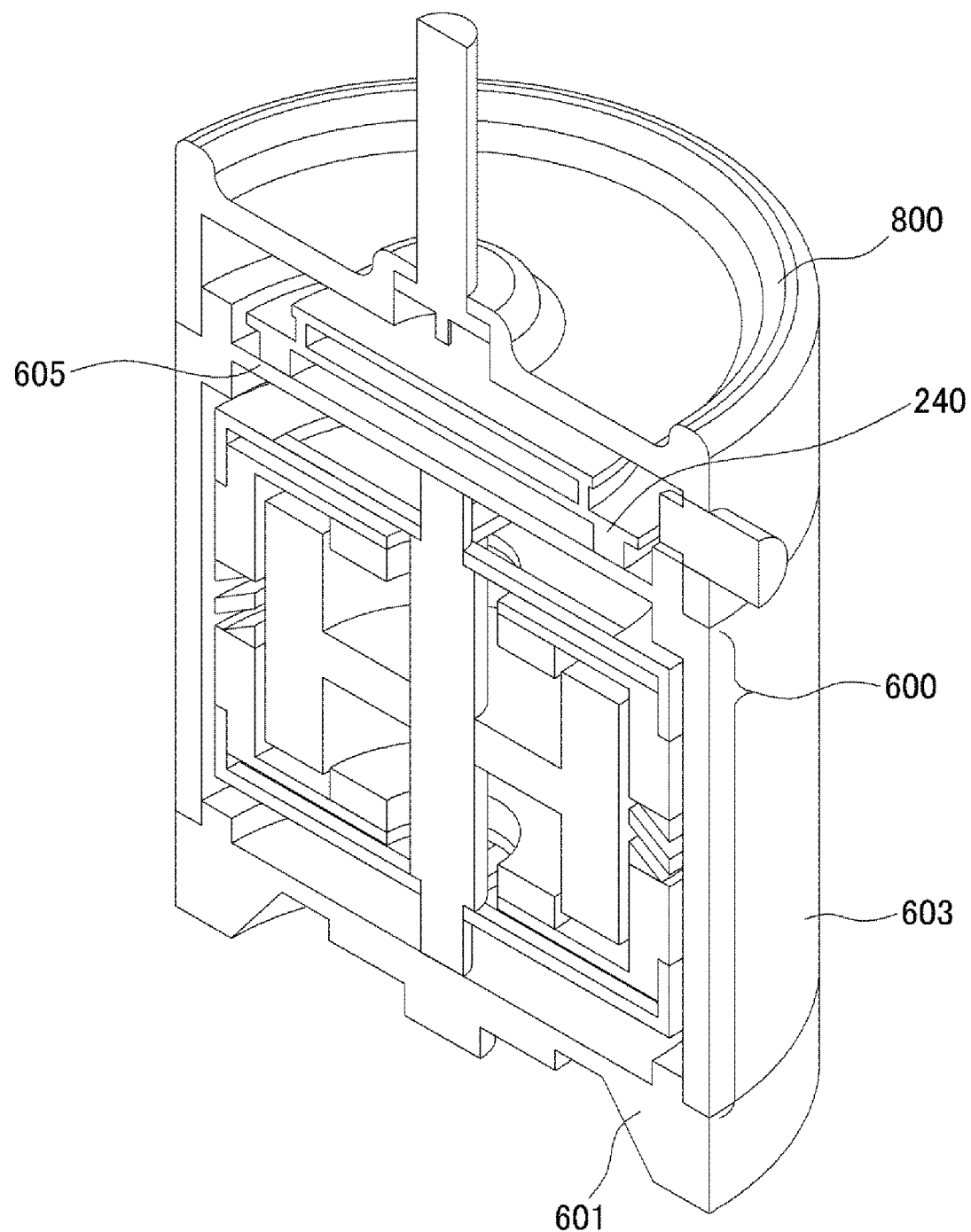
FIG. 16 is a cross-sectional perspective view of a wireless sensor device in accordance with another exemplary embodiment of the present disclosure.

FIG. 16 is a cross-sectional perspective view of a wireless sensor device in accordance with another exemplary embodiment of the present disclosure.

FIG. 16 illustrates that the wireless sensor device 200 in accordance with another exemplary embodiment of the present disclosure includes the energy harvester 600 and the communication unit 240 illustrated in FIG. 10 to FIG. 13. Herein, the communication unit 240 is supplied with converted energy from the energy harvester 600 and wirelessly transmits measured sensing information. For reference, the wireless sensor device 200 including the energy harvester 600 and the communication unit 240 may be formed to have a structure as shown in FIG. 5.

As illustrated in FIG. 16, the energy harvester 600 may be inserted into the wireless sensor device 200 as being surrounded by the lower supporting plate 601, the upper supporting plate 605, and the lateral supporting plate 603, and the communication unit 240 may be inserted into the wireless sensor device 200 as being surrounded by a cylinder-shaped housing part 800.

Meanwhile, a railroad vehicle monitoring method using a railroad vehicle monitoring system installed on a railroad vehicle in accordance with an exemplary embodiment of the present disclosure may include: collecting, in real time, a sensing value of a status of an attached equipment wirelessly transmitted from a wireless sensor device installed at each attached equipment of the railroad vehicle; generating railroad vehicle status information including a sensing value from at least one wireless senor device; and performing at least one of outputting, in real time, the railroad vehicle status information through a display unit installed on the railroad vehicle and wirelessly transmitting the railroad vehicle status information to an external control device through a wireless communication network.

Herein, the wireless sensor device includes an energy harvester configured to convert at least one kind of energy generated by running of the railroad vehicle into electric energy, and uses the electric energy supplied by the energy harvester as a power source for a sensing operation, a signal process with respect to a sensing value, and wireless communication.

Further, the railroad vehicle monitoring method in accordance with an exemplary embodiment of the present disclosure may further include: after the generating railroad vehicle status information, determining and predicting occurrence of a failure in each attached equipment on the basis of the railroad vehicle status information and two or more thresholds preset for each attached equipment and generating railroad vehicle diagnostic information on the basis of a result of the determining and predicting occurrence of a failure; and performing at least one of outputting, in real time, the railroad vehicle diagnostic information through the display unit and wirelessly transmitting the railroad vehicle diagnostic information to the external control device.

Herein, the determining and predicting occurrence of a failure may include: comparing a sensing value from each wireless sensor device included in the railroad vehicle status information with each of a first threshold value preset for each attached equipment and a second threshold value lower than the first threshold value; and determining that a failure occurs when the sensing value is equal to or higher than the first threshold value or determining that a failure can occur when the sensing value is lower than the first threshold value and equal to or higher than the second threshold value.

Further, the railroad vehicle monitoring method in accordance with an exemplary embodiment of the present disclosure may further include: after the wirelessly transmitting the railroad vehicle status information to an external control device, wirelessly receiving maintenance instruction information from the external control device in response to the wirelessly transmitted railroad vehicle status information and outputting the maintenance instruction information through the display unit.

Furthermore, in the railroad vehicle monitoring method in accordance with an exemplary embodiment of the present disclosure, the sensing value wirelessly transmitted from the wireless sensor device is obtained by converting original data sensed by a sensor included in the wireless sensor device into digital data through a preset sampling process and quantization process. Herein, conditions for the sampling process may be updated on the basis of a vibration frequency generated during driving of the railroad vehicle.

Meanwhile, a method for performing communication of a wireless sensor device in accordance with an exemplary embodiment of the present disclosure may include: operating by receiving electricity from an energy harvester configured to convert vibration generated from a broadband vibration source into the electricity; and transmitting sensing information transferred from a sensor by a communication module fixed by an elastic member arranged to receive the vibration.

Herein, the elastic member is configured as a mechanical filter structure to limit a frequency range and an acceleration magnitude for the communication module and transfers vibration passing through the mechanical filter structure to the communication module.

Further, the frequency range is limited such that an average acceleration for each frequency of the vibration is equal to or lower than a preset reference value.

Meanwhile, an energy harvester configured to vibration into electricity in accordance with another exemplary embodiment of the present disclosure includes: a first central shaft; a first elastic part arranged along the first central shaft and designed to vibrate in response to vibration having a first vibration frequency as a center frequency; a first mass part arranged along the first central shaft and combined with the first elastic part; a first magnetic body arranged along the first central shaft and combined with the first mass part; a second central shaft arranged along the same axis as the first central shaft; a second elastic part arranged along the second central shaft and designed to vibrate in response to vibration having a second vibration frequency as a center frequency; a second mass part arranged along the second central shaft and combined with the second elastic part; a second magnetic body arranged along the second central shaft and combined with the second mass part; a damping unit configured to connect the first central shaft and the second central shaft; and a coil part which is arranged along the first central shaft and the second central shaft and into which the first magnetic body or the second magnetic body is inserted in response to vibration of the first elastic part or the second elastic part, respectively.

Herein, the first elastic part, the second elastic part, the first mass part, the second mass part, the first magnetic body, and the second magnetic body may be formed into a cylindrical shape including an opening through which the first central shaft or the second central shaft passes.

Further, if the first vibration frequency may be a vibration frequency corresponding to a preset first speed or more, the second vibration frequency is a vibration frequency corresponding to a preset second speed or less, and the first speed has a higher speed value than the second speed.

Furthermore, the coil part may include: a first groove formed along an inner peripheral surface of the first mass part; a second groove formed along an inner peripheral surface of the second mass part; and coils respectively wound on the first grove and the second groove.

Moreover, the energy harvester may further include: a lower supporting plate installed and fixed to the vibration source, connected to the second central shaft as being fixed thereto, and also formed to be separated from the second elastic part; a lateral supporting plate connected to the lower supporting plate and formed to be separated from peripheral surfaces of the first mass part and the second mass part; and an upper supporting plate connected to the first central shaft as being fixed thereto, connected to the lateral supporting plate, and also formed to be separated from the first elastic part.

Further, a lower surface of the first central shaft is connected to one surface of the damping unit, and an upper surface of the second central shaft is connected to the other surface of the damping unit. The first mass part is combined with a lower part of the first elastic part, and the first magnetic body is combined with a partial surface of the first mass part facing an upper part of the coil part and inserted into the upper part of the coil part. The second mass part is combined with an upper part of the second elastic part, and the second magnetic body is combined with a partial surface of the second mass part facing a lower part of the coil part and inserted into the lower part of the coil part.

Meanwhile, a wireless sensor device in accordance with another exemplary embodiment of the present disclosure may include the above-described energy harvester, and a communication module supplied with converted energy from the energy harvester and configured to transmit measured sensing information.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

I claim:

1. A wireless sensor device comprising:
   an energy harvester configured to convert vibration generated from a broadband vibration source into electricity;
   an elastic member arranged to receive the vibration and connected to the energy harvester; and
   a communication unit fixed by the elastic member, supplied with the converted electricity from the energy harvester, and configured to transmit sensing information obtained by sensing a measurement target,
   wherein the elastic member operates as a mechanical filter configured to limit a frequency range and an acceleration magnitude of the vibration to be transferred to the communication unit for stabilizing the performance of the communication unit, and the communication unit is arranged to receive vibration passing through the elastic member.

2. The wireless sensor device of claim 1,
   wherein the elastic member includes:
   a spring having a natural frequency previously set depending on the specifications of the communication unit, and configured to limit the frequency range; and
   an elastic mass arranged on the spring and configured to limit the acceleration magnitude,
   wherein the natural frequency is previously set on the basis of a mass of the communication unit,
   a mass of the elastic mass, and an intrinsic constant of the spring, and the frequency range is limited to make an average acceleration for each frequency of the vibration equal to or lower than a preset reference value.

3. The wireless sensor device of claim 2,
   wherein the elastic member further includes a damper configured to limit displacement of the spring and the elastic mass.

4. The wireless sensor device of claim 2,
   wherein the energy harvester converts the vibration into electricity by using a frequency at which an average acceleration for each frequency of the vibration is maximized.

5. An energy harvester configured to convert vibration into electricity, comprising:
   a first elastic part configured to vibrate in response to vibration having a first vibration frequency as a center frequency;
   a first mass part combined with the first elastic part;
   a first magnetic body combined with the first mass part;
   a second elastic part configured to vibrate in response to vibration having a second vibration frequency as a center frequency;
   a second mass part combined with the second elastic part;
   a second magnetic body combined with the second mass part;
   a central shaft combined with the first elastic part, the second elastic part, the first mass part, the second mass part, the first magnetic body, and the second magnetic body; and
   a coil part which is arranged along the central shaft and into which the first magnetic body or the second magnetic body is inserted in response to vibration of the first elastic part or the second elastic part, respectively.

6. The energy harvester of claim 5,
   wherein the first elastic part, the second elastic part, the first mass part, the second mass part, the first magnetic body, and the second magnetic body are formed into a cylindrical shape including an opening through which the central shaft passes.

7. The energy harvester of claim 5,
   wherein the first vibration frequency corresponds to a preset first speed or more, the second vibration frequency corresponds to a preset second speed or less, and the first speed has a higher speed value than the second speed.

8. The energy harvester of claim 5,
   wherein the coil part includes:
   a first groove formed along an inner peripheral surface of the first mass part;
   a second groove formed along an inner peripheral surface of the second mass part; and
   coils respectively wound on the first grove and the second groove.

9. The energy harvester of claim 5, further comprising:
   a lower supporting plate installed and fixed to a vibration source, connected to the central shaft as being fixed thereto, and also formed to be separated from the second elastic part;

a lateral supporting plate connected to the lower supporting plate and formed to be separated from peripheral surfaces of the first mass part and the second mass part; and an upper supporting plate connected to the central shaft as being fixed thereto, connected to the lateral supporting plate, and also formed to be separated from the first elastic part.

10. The energy harvester of claim 5, further comprising:
a third elastic part combined between the first mass part and the second mass part.

11. The energy harvester of claim 5,
wherein the first mass part is combined with an upper surface of the third elastic part and a lower part of the first elastic part, and the first magnetic body is combined with a partial surface of the first mass part facing an upper part of the coil part and inserted into the upper part of the coil part, and the second mass part is combined with a lower surface of the third elastic part and an upper part of the second elastic part, and the second magnetic body is combined with a partial surface of the second mass part facing a lower part of the coil part and inserted into the lower part of the coil part.

* * * * *